(12) United States Patent
Ohta et al.

(10) Patent No.: US 7,778,174 B2
(45) Date of Patent: Aug. 17, 2010

(54) SHAPER CIRCUIT AND SHAPER CIRCUIT COMBINATION

(75) Inventors: Yoko Ohta, Fukuoka (JP); Katsumi Imamura, Fukuoka (JP); Yasushi Kurokawa, Fukuoka (JP); Hideyo Fukunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 11/448,923

(22) Filed: Jun. 7, 2006

(65) Prior Publication Data

US 2007/0223375 A1 Sep. 27, 2007

(30) Foreign Application Priority Data

Mar. 23, 2006 (JP) .............................. 2006-080802

(51) Int. Cl.
*H04J 1/16* (2006.01)
(52) U.S. Cl. .................. 370/230.1; 370/231; 370/235.1
(58) Field of Classification Search .............. 370/235.1, 370/230, 230.1, 235, 231
See application file for complete search history.

(56) References Cited

U.S. PATENT DOCUMENTS

| | | | | |
|---|---|---|---|---|
| 6,167,027 A * | 12/2000 | Aubert et al. ............... | 370/230 |
| 6,247,061 B1 * | 6/2001 | Douceur et al. ............. | 709/240 |
| 6,801,500 B1 * | 10/2004 | Chandran ................. | 370/230.1 |
| 7,330,430 B2 * | 2/2008 | Lodha ...................... | 370/230.1 |
| 7,392,279 B1 * | 6/2008 | Chandran et al. ........... | 709/200 |
| 7,602,721 B1 * | 10/2009 | Tangirala et al. .......... | 370/235.1 |
| 2003/0123390 A1 | 7/2003 | Takase et al. | |
| 2004/0213276 A1 * | 10/2004 | Yamada ...................... | 370/412 |
| 2005/0141416 A1 * | 6/2005 | Kobayashi et al. .......... | 370/229 |
| 2005/0169176 A1 * | 8/2005 | Onoe et al. ................. | 370/230 |
| 2006/0077904 A1 * | 4/2006 | Brandenburg et al. ....... | 370/252 |
| 2006/0268719 A1 * | 11/2006 | Takase et al. ............ | 370/235.1 |
| 2007/0076613 A1 * | 4/2007 | Malhotra et al. ......... | 370/235.1 |

FOREIGN PATENT DOCUMENTS

JP 2002-368798 12/2002
JP 2003-198611 7/2003

* cited by examiner

*Primary Examiner*—Ricky Ngo
*Assistant Examiner*—Dewanda Samuel
(74) *Attorney, Agent, or Firm*—Fujitsu Patent Center

(57) ABSTRACT

A shaper circuit includes a storage part storing a current token, an add token, and a max token, a subtraction part subtracting a packet length of a dequeue target from the current token stored in the storage part and storing the current token in the storage part, an addition part adding the add token stored in the storage part to the current token stored in the storage part at constant periodic intervals and storing the current token in the storage part, a comparison part comparing the result of the addition with the max token stored in the storage part and preventing the addition result from exceeding the max token, and a determining part outputting a dequeue permission request. A number of bits in a decimal part of the current token are set and a number of bits in an integer part of the add token are set.

6 Claims, 24 Drawing Sheets

FIG.14

| INPUT SIGNAL TO COMBINED PROCESSING PART | | | | OUTPUT SIGNAL FROM COMBINED PROCESSING PART | |
|---|---|---|---|---|---|
| Equal_a | Over_a | Equal_b | Over_b | Max | CONDITION |
| 0 | 0 | 0 | 0 | 0 | CURRENT TOKEN < MAX TOKEN |
| 1 | 0 | 0 | 0 | 0 | CURRENT TOKEN < MAX TOKEN |
| 0 | 1 | 0 | 0 | 0 | CURRENT TOKEN < MAX TOKEN |
| 0 | 0 | 1 | 0 | 0 | CURRENT TOKEN < MAX TOKEN |
| 1 | 0 | 1 | 0 | 0 | CURRENT TOKEN = MAX TOKEN |
| 0 | 0 | 0 | 1 | 1 | CURRENT TOKEN > MAX TOKEN |
| 1 | 0 | 0 | 1 | 1 | CURRENT TOKEN > MAX TOKEN |
| 0 | 1 | 0 | 1 | 1 | CURRENT TOKEN > MAX TOKEN |

FIG.24

| INPUT SIGNAL TO COMBINED PROCESSING PART | | | | OUTPUT SIGNAL FROM COMBINED PROCESSING PART | |
|---|---|---|---|---|---|
| Equal_a | Over_a | Equal_b | Over_b | Max | CONDITION |
| 0 | 0 | 0 | 0 | 0 | CURRENT TOKEN < THRESHOLD |
| 1 | 0 | 0 | 0 | 0 | CURRENT TOKEN < THRESHOLD |
| 0 | 1 | 0 | 0 | 0 | CURRENT TOKEN < THRESHOLD |
| 0 | 0 | 1 | 0 | 0 | CURRENT TOKEN < THRESHOLD |
| 1 | 0 | 1 | 0 | 0 | CURRENT TOKEN = THRESHOLD |
| 0 | 1 | 1 | 0 | 1 | CURRENT TOKEN > THRESHOLD |
| 0 | 0 | 0 | 1 | 1 | CURRENT TOKEN > THRESHOLD |
| 1 | 0 | 0 | 1 | 1 | CURRENT TOKEN > THRESHOLD |
| 0 | 1 | 0 | 1 | 1 | CURRENT TOKEN > THRESHOLD |

SHAPER CIRCUIT AND SHAPER CIRCUIT COMBINATION

BACKGROUND OF THE INVENTION

1. Field of the Invention

The present invention generally relates to a shaper circuit and a shaper circuit combination, and more particularly to a shaper circuit of a transmission apparatus for transmitting variable length packets.

2. Description of the Related Art

In recent years and continuing, the widespread use of the Internet and intranet has caused network traffic to grow significantly. It is, therefore, desired to improve the infrastructural technology along with the growth of IP (Internet Protocol) traffic. In particular, one objective is attaining a satisfactory quality during packet transfer.

Currently, shaper circuits, which are used for controlling the bandwidth through which packets are transmitted, have different configurations depending on the bandwidth and precision requested by the user of a transmission apparatus. Therefore, whenever a new transmission apparatus is developed, the shaper circuit is subjected to considerable amounts of design modifications and extensive testing in order to attain a satisfactory quality with respect to the new transmission apparatus. In order to respond to the demands for shortening the development period while maintaining a constant quality, a shaper circuit that is applicable to new transmission apparatuses is desired.

FIG. 1 is a block diagram showing an exemplary configuration of a transmission apparatus. In FIG. 1, received packets are stored in a shared memory 11. The packet distinguishing part 12 distinguishes (identifies) enqueue information of the received packets (e.g. priority class, packet length) of the received packets according to the information stored in the received packets.

The enqueue information is delivered to a scheduler part 13. The scheduler part 13 stores the enqueue information in its queues 13a-13c that are divided into priority classes. Once the information is stored in the queues 13a-13c, the scheduler part 13 sends a dequeue request to a shaper circuit 13d.

The shared memory 11 reads out packet information of the dequeued packets and sends to a next step.

FIG. 2 is a block diagram showing an example of a conventional shaper circuit. In this example, a token bucket algorithm is used. FIG. 2 shows a shaper circuit 20 having a parameter storage part 21 and a token addition/subtraction part 22 which may play as a central part in the shaper circuit 20. A current token 21a, an add token 21b, and a max token 21c are fixed parameters that are stored in the parameter setting part 21.

The shaper circuit 20 requests for dequeue permission with respect to external queues 13a-13c and receives dequeue instructions and packet lengths from the queues 13a-13c.

When dequeue instructions and packet lengths are input to the shaper circuit 20, a dequeue subtraction part inside the token addition/subtraction part 22 subtracts a length from the current token 21a which is stored as a parameter in the parameter storage part 21. After the current token 21a is subjected to the length subtraction, the current token 21a is returned to the parameter storage part 21. The dequeue permission determination part 21d determines whether to execute the next dequeue based on the results of the subtraction and outputs a dequeue permission request signal requesting for dequeue permission.

Meanwhile, a token is added at constant periodic intervals (token addition period). An add token addition part 22b adds an add token to the current token 21a. After the current token 21a is subjected to the add token addition, a max token part 22c compares the current token 21a with a max token 21c and sets the value of the current token 21a to be equal to the maximum value of the maximum token 21c. Then, after setting the value of the current token, the max token part 22c returns the current token 21a to the parameter storage part 21. Then, the dequeue permission determination part 21d determines whether to execute the next dequeue based on the value of the current value 21a and outputs a signal indicative of a dequeue permission request.

Next, the parameters including the current token, the add token, and the max token are described with reference to FIG. 3. The number of bits differs depending on factors such as the bandwidth and/or precision required by a transmission apparatus and is obtained by the below described process. Here, the bandwidth is indicated using bps (bits per second) which is a unit used in expressing the data transmission rate of a communication line, for example. 1 [bps] indicates that 1 bit of data can be transferred in a single second.

The current token 21a includes a code part (1 bit), an integer part A (A bits), and a decimal part B (B bits) [X=A+B]. The A bits of the integer part are equal to the number of bits in an integer part of the max token 21c. The B bits of the decimal part are equal to the number of bits in a decimal part of the add token 21b.

The add token 21b includes an integer part "a" (a bits) and a decimal part "B" (B bits). Since the shaping rate "R" is expressed as [R=add token×8/token addition period], the add token satisfies a relationship of [add token=R×token addition period/8]. The value of a of the integer part "a" of the add token 21b is determined by the value of the upper limit (supremum) of the shaping rate R. The value of B of the decimal part B of the add token 21b is determined by the value of the bottom limit (infimum) of the shaping rate R.

For example, in a case where the shaping rate R satisfies a relationship of 1 Mbps$\leq$R$\leq$10 Gbps and where the token addition period is 200 ns, the add token 21b is as follows. That is, in a case where the shaping rate R is a band of 10 Gbps, the add token 21b satisfies a relationship of [add token<$2^6$] (bytes) and the number of bits of its integer part "a" is 7 bits. In a case where the shaping rate R is a band of 1 Mbps, the add token 21b satisfies a relationship of [add token>$2^{-8}$] and the number of bits of its decimal part "B" is 8 bits.

Furthermore, the number of the bits of the decimal part "B" increases depending on the precision (granularity) to be obtained. For example, 6 bits are added for obtaining a precision satisfying a relationship of 3% (3/100)>$2^6$. Accordingly, in this case, the add token 21b includes 7 bits in its integer part and 14 (=8+6) bits in its decimal part. The max token 21c includes an integer part "A" (A bits). The number of bits of the integer part "A" is determined according to the maximum burst size.

The token addition period is no more than the minimal interval of packet transmission where burst transmission is not permitted due to error.

FIG. 4 is a schematic diagram showing a token bucket algorithm which is a basic algorithm used by a shaper circuit. In this token bucket algorithm, a token is added at predetermined intervals and a packet length is subtracted from a token upon a dequeue process. The shaping rate R satisfies a relationship of [R=add token value/token addition period]. Furthermore, a max token value equals the peak value of the contained buckets for limiting the burst.

The shaper circuit stores packet information into queues in an enqueu process. When a predetermined amount of packet information is accumulated in a corresponding queue, the queue is selected as the dequeue target. Then, in a dequeue process, the dequeue target is subjected to token subtraction for subtracting a predetermined packet length therefrom. An add token value is added at constant intervals (token addition period).

It is determined whether to dequeue a next enqueue packet by referring to the result of the token subtraction process or the periodic token addition of a previous dequeue packet (dequeue packet immediately before the next enqueue packet). In a case where the result of the token subtraction process or the periodic token addition of a previous dequeue packet is 0 or more, the next dequeue is possible.

If it is determined that the next dequeue is possible, a dequeue permission request is output. In a case where there is a dequeue instruction in response to the dequeue permission request, a predetermined packet length is subtracted from the next dequeue target (token). The determination is again conducted based on whether the subtraction result is less than 0.

In Japanese Laid-Open Patent Application No. 2003-198611, it is disclosed that a leaky bucket part changes the incremented value according to a level count value. In Japanese Laid-Open Patent Application No. 2002-368798 discloses a method of monitoring the band by providing a monitor mode corresponding to an input line and switching a leaky bucket algorithm according to flow identification information of input packets.

Conventionally, each transmission apparatus has its unique shaper since the number of bits of its parameters is fixed.

The following describes an exemplary case of sharing a shaper circuit between a first transmission apparatus and a second transmission apparatus. In the first transmission apparatus, the number of bits required for a parameter is 32 bits in order to satisfy a desired bandwidth and precision. Meanwhile, in the second transmission apparatus, the number of bits required for a parameter is 64 bits in order to satisfy the needs of the user.

In this case, among the shaper circuits of the first and second transmission apparatuses, the shaper circuit having a higher performance (function) is to be used as the shaper circuit shared by the first and second transmission apparatuses (in this case, the shaper circuit has 64 bits). However, in this case, although it may be possible to obtain a shared shaper circuit, the hardware scale (configuration) increases two times when this shaper circuit is applied.

Furthermore, since the number of bits of the parameters (bit numbers in the integer part and the decimal part) are fixed, a new shaper part is to be designed whenever a transmission apparatus having different specifications (e.g. band, precision, and number of queues) is developed. Therefore, whenever a new transmission apparatus is developed, the shaper circuit is subjected to considerable design modification and extensive testing in order to attain a satisfactory quality with respect to the new transmission apparatus.

SUMMARY OF THE INVENTION

The present invention may provide a shaper circuit and a shaper circuit combination that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a shaper circuit and a shaper circuit combination particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a shaper circuit for controlling input packets using a token bucket algorithm, the shaper circuit including a parameter storage part for storing a current token, an add token, and a max token therein; a dequeue subtraction part for subtracting a packet length of a dequeue target from the current token stored in the parameter storage part and storing the current token in the parameter storage part; an add token addition part for adding the add token stored in the parameter storage part to the current token stored in the parameter storage part at constant periodic intervals and storing the current token in the parameter storage part; a max token comparison part for comparing the result of the addition of the add token addition part with the max token stored in the parameter storage part and preventing the addition result from exceeding the max token; and a dequeue permission determining part for outputting a dequeue permission request when the result of the subtraction of the dequeue subtraction part is no less than 0 and when the result of the addition of the add token addition part is no less than 0; wherein the number of bits that are set to each of the current token, the add token, and the max token stored in the parameter storage part are variable.

Furthermore, another embodiment of the present invention provides a shaper circuit combination, the shaper circuit combination including first and second shaper circuits, each shaper circuit having substantially the same configuration as the shaper circuit according to an embodiment of the present invention; and a combined processing part connected between the first and second shaper circuits for expanding the number of bits of the current token, the add token, and the max token stored in the parameter storage part of the first and second shaper circuits.

Furthermore, another embodiment of the present invention provides a shaper circuit for controlling input packets using a leaky bucket algorithm, the shaper circuit including a parameter storage part for storing a current token, a sub token, and a threshold therein; a dequeue length addition part for adding a packet length of a dequeue target to the current token stored in the parameter storage part and storing the current token in the parameter storage part; a sub token subtraction part for subtracting the sub token stored in the parameter storage part from the current token stored in the parameter storage part at constant periodic intervals and storing the current token in the parameter storage part; a threshold comparison part for comparing the result of the addition of the dequeue length addition part with the threshold stored in the parameter storage part and requesting dequeue permission when the addition result is no greater than the threshold; and a dequeue permission determining part for outputting a dequeue permission request when the result of the subtraction of the sub token subtraction part is greater than 0; wherein the number of bits in each of the current token, the sub token, and the threshold stored in the parameter storage part are variable.

Furthermore, another embodiment of the present invention provides a shaper circuit combination, the shaper circuit combination including first and second shaper circuits, each shaper circuit having substantially the same configuration as the shaper circuit according to an embodiment of the present invention; and a combined processing part connected between the first and second shaper circuits for expanding the number of bits of the current token, the sub token, and the threshold stored in the parameter storage part of the first and second shaper circuits.

Other objects and further features of the present invention will be apparent from the following detailed description when read in conjunction with the accompanying drawings.

BRIEF DESCRIPTION OF THE DRAWINGS

FIG. 14 is a schematic diagram showing a determination table according to an embodiment of the present invention;

FIG. 24 is a schematic diagram showing a determination table according to another embodiment of the present invention.

DESCRIPTION OF THE PREFERRED EMBODIMENTS

In the following, embodiments of the present invention will be described with reference to the accompanying drawings.

First Embodiment

Figure 1:
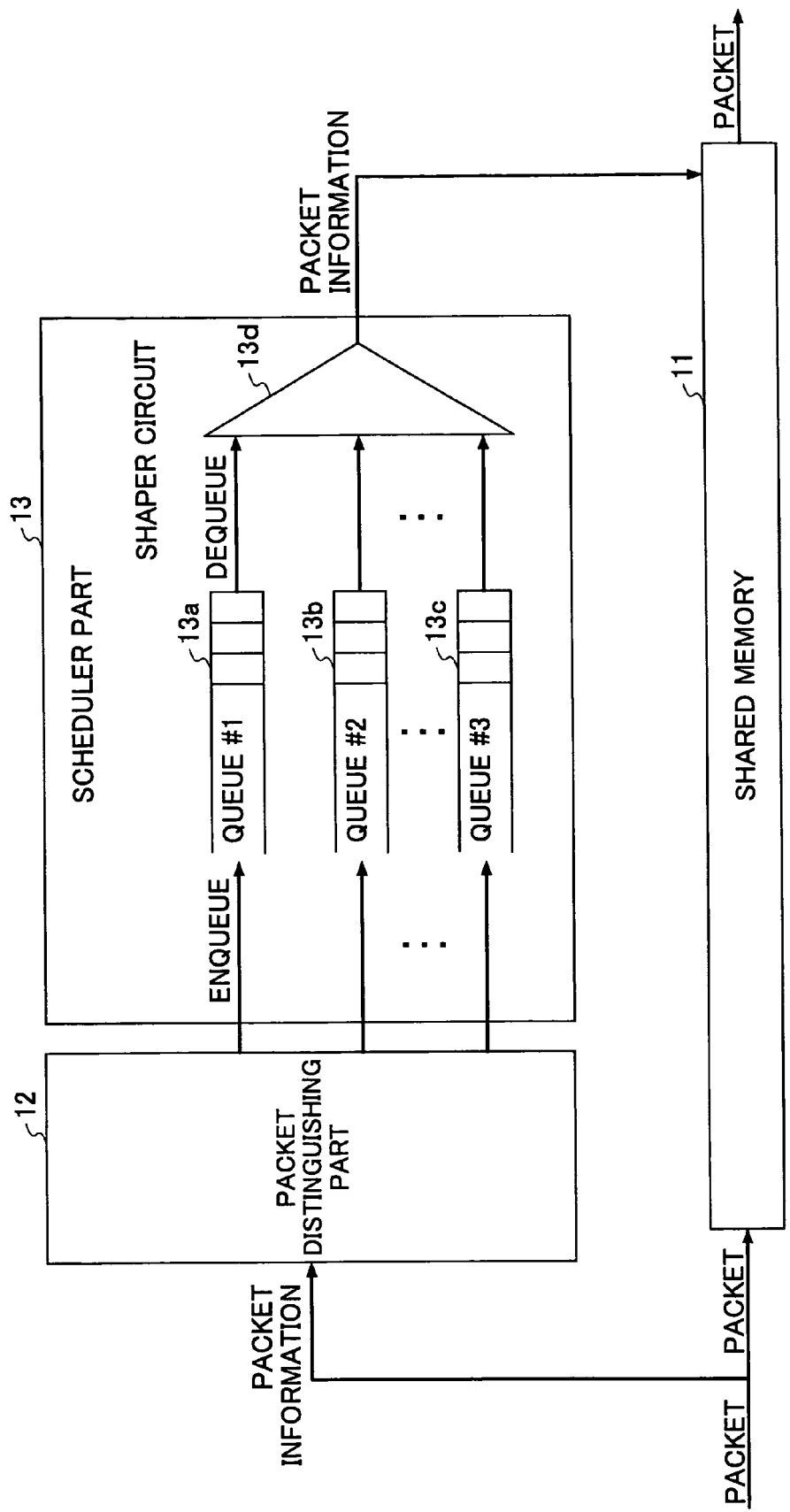
FIG. 1 is a block diagram showing an example of a transmission apparatus.
Figure 2:
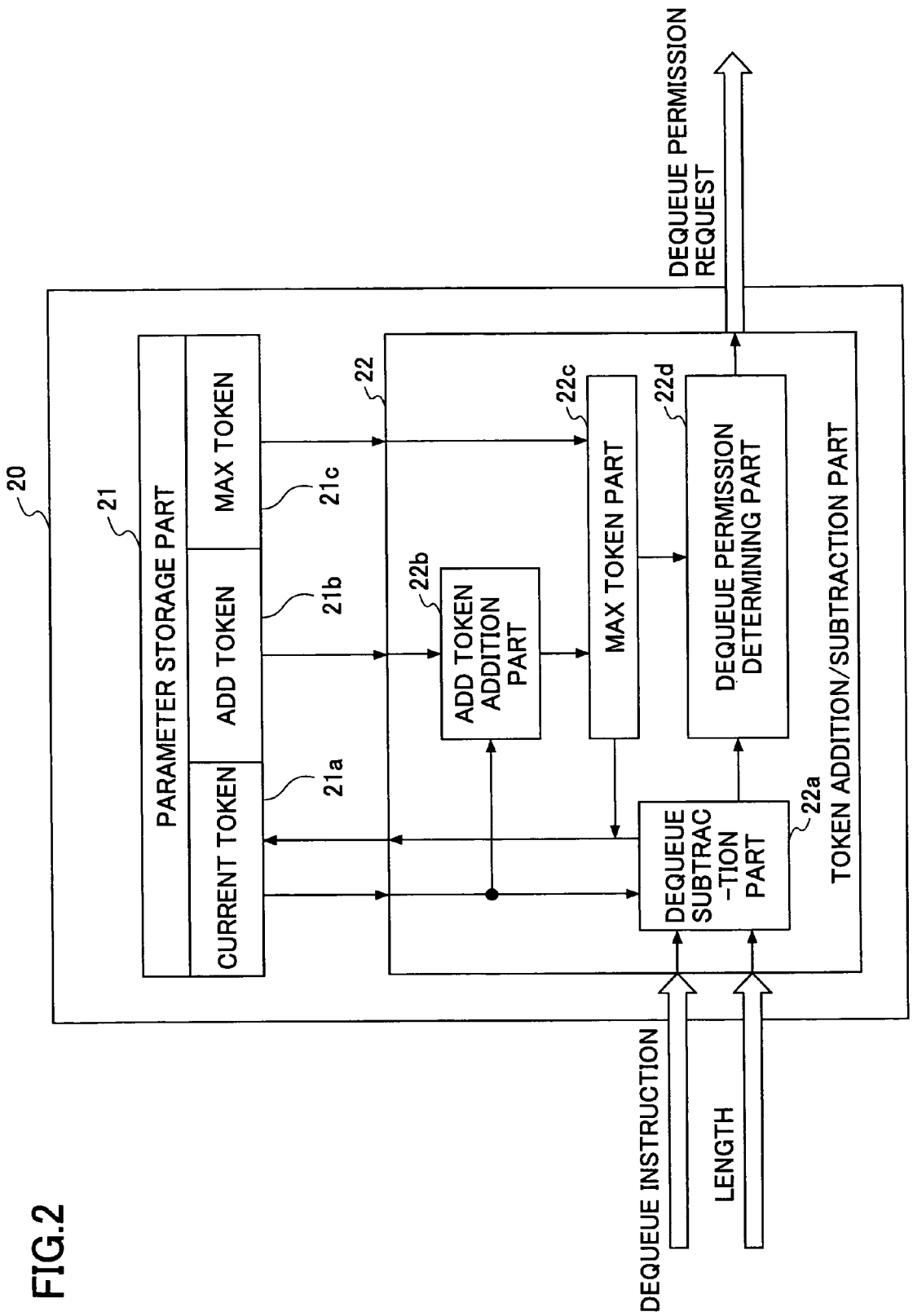
FIG. 2 is a block diagram showing an example of a conventional shaper circuit.
Figure 3:
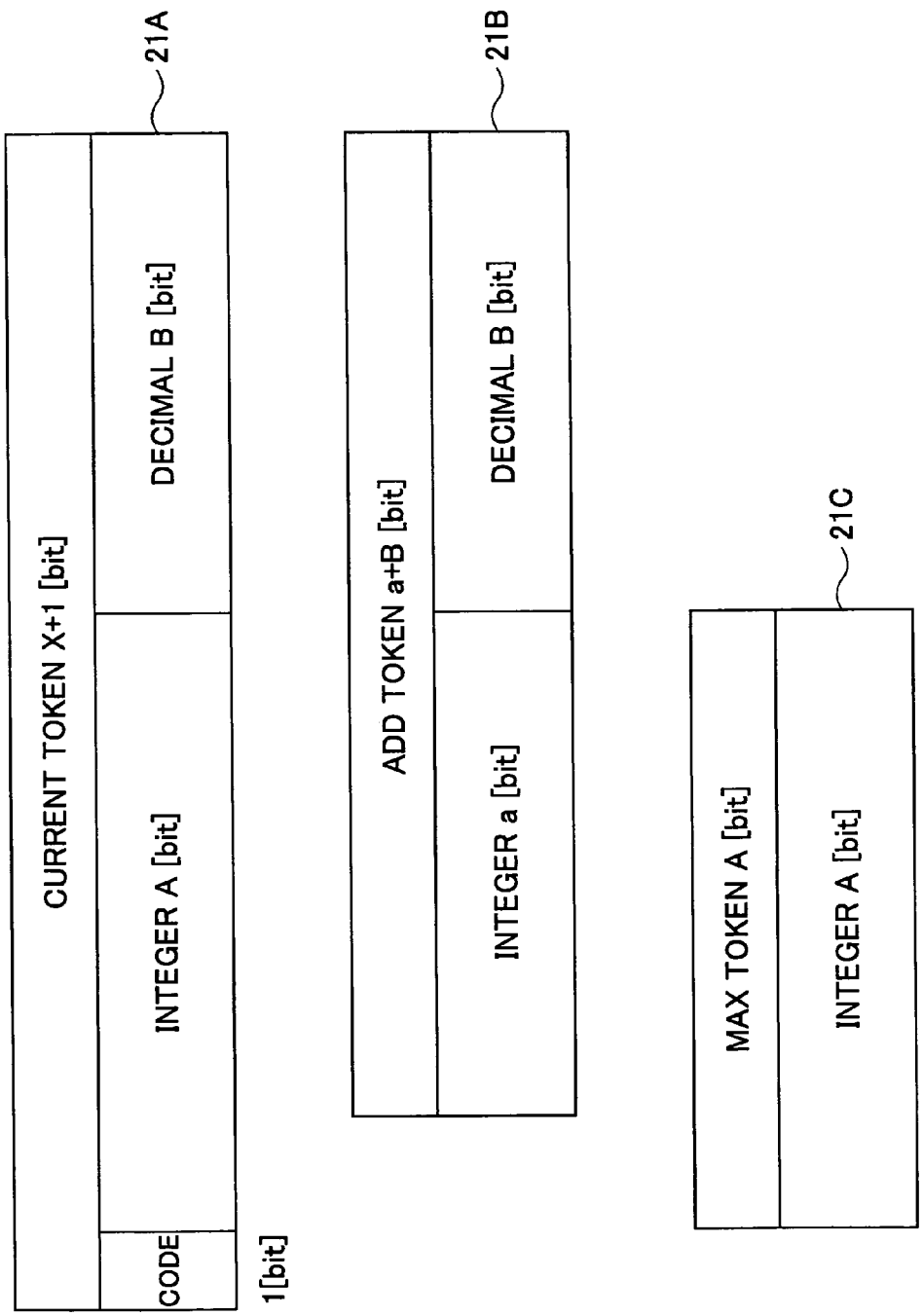
FIG. 3 is a schematic diagram for describing various parameters.
Figure 4:
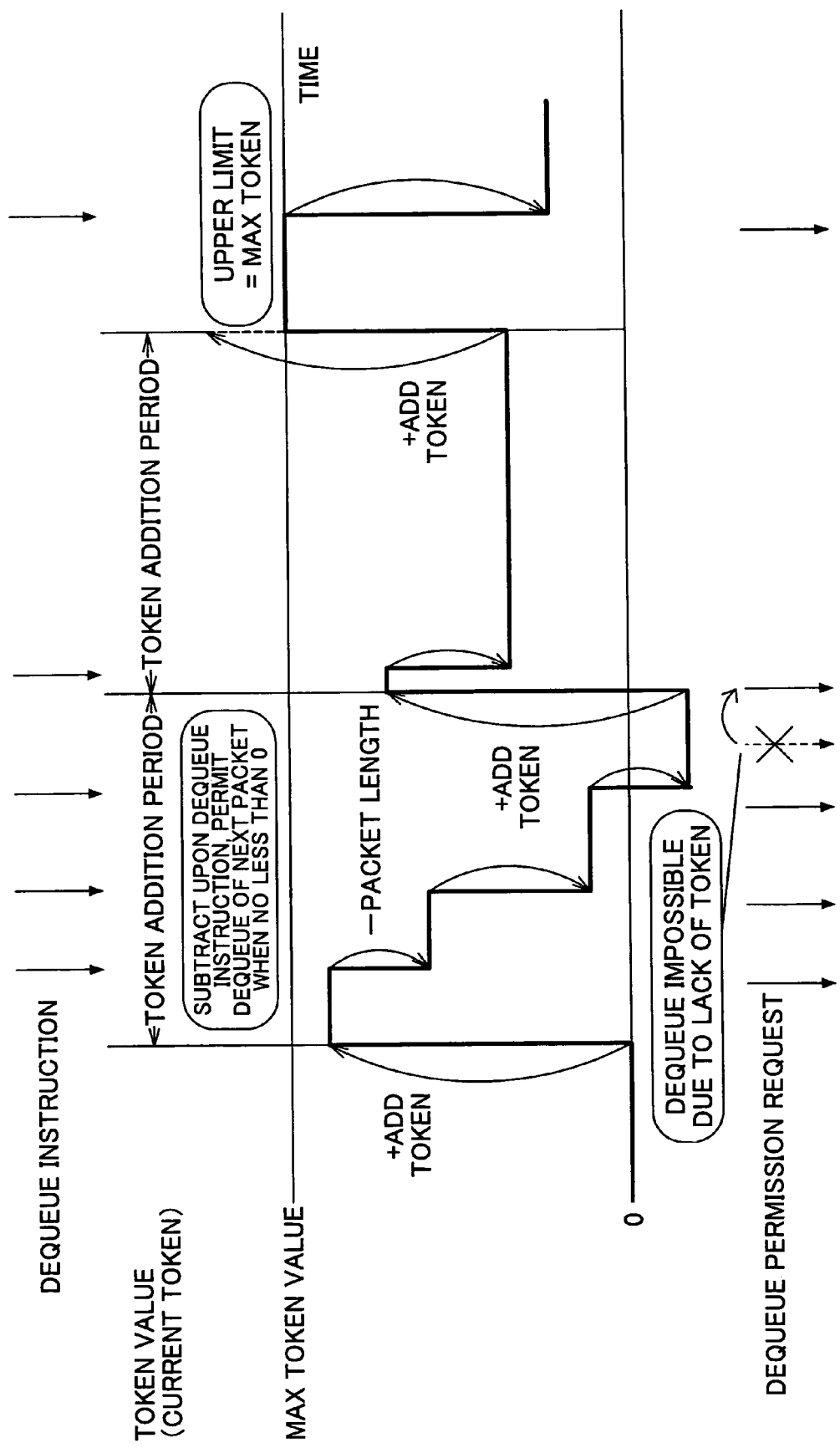
FIG. 4 is a schematic diagram for describing a token bucket algorithm.
Figure 5:
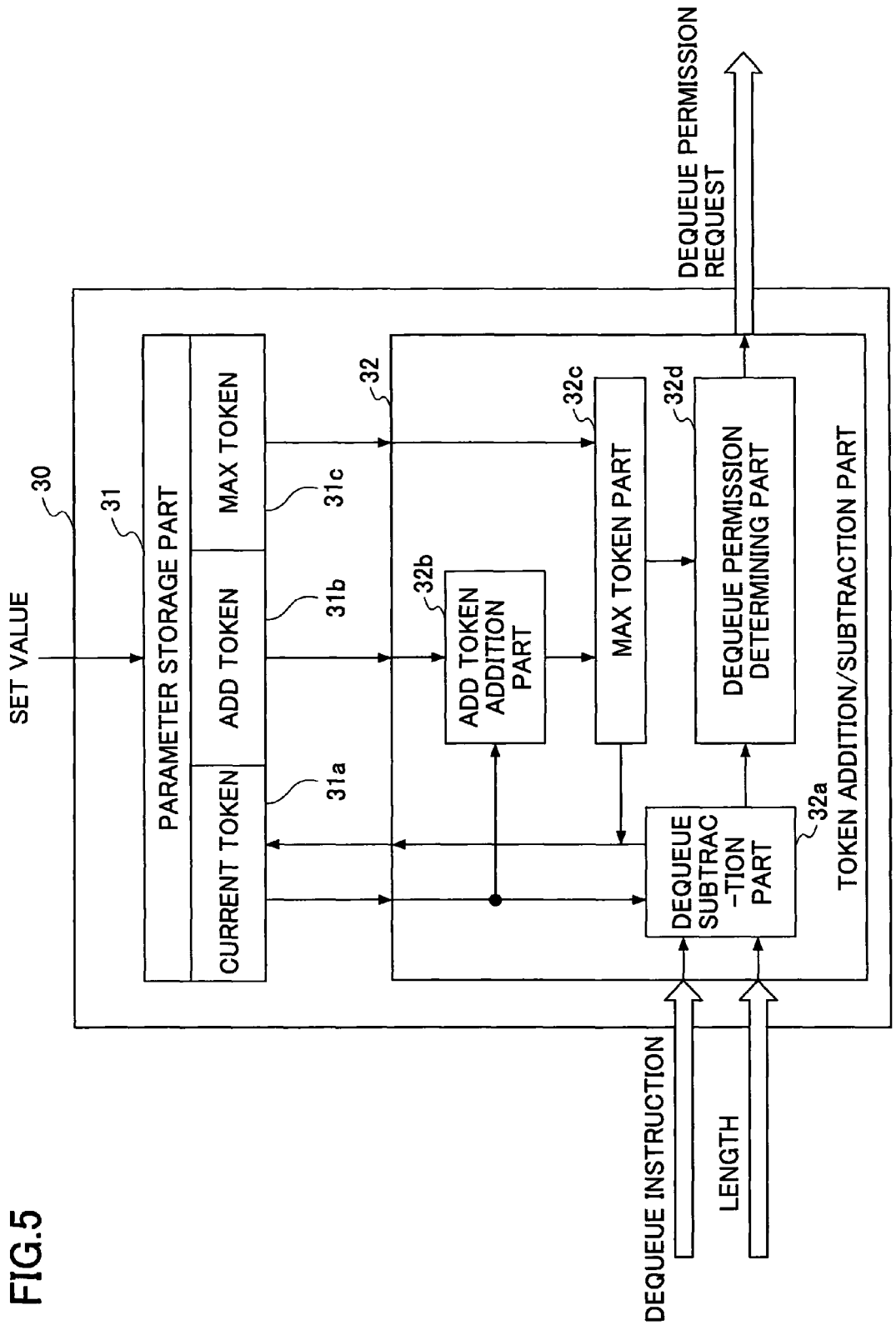
FIG. 5 is a schematic diagram showing an exemplary configuration of a shaper circuit according to a first embodiment of the present invention.

FIG. 5 is a schematic diagram showing an exemplary configuration of a shaper circuit according to a first embodiment of the present invention. FIG. 5 shows a shaper circuit 30 having a parameter storage part 31 and a token addition/subtraction part 32 which may play as one of the central parts in the shaper circuit 30. A current token 31$a$, an add token 31$b$, and a max token 31$c$ are variable parameters that are stored in the parameter setting part 31. The token addition/subtraction part 32 includes a dequeue subtraction part 32$a$, an add token addition part 32$b$, a max token comparison part 32$c$, and a dequeue permission determining part 32$d$.

Figure 6:
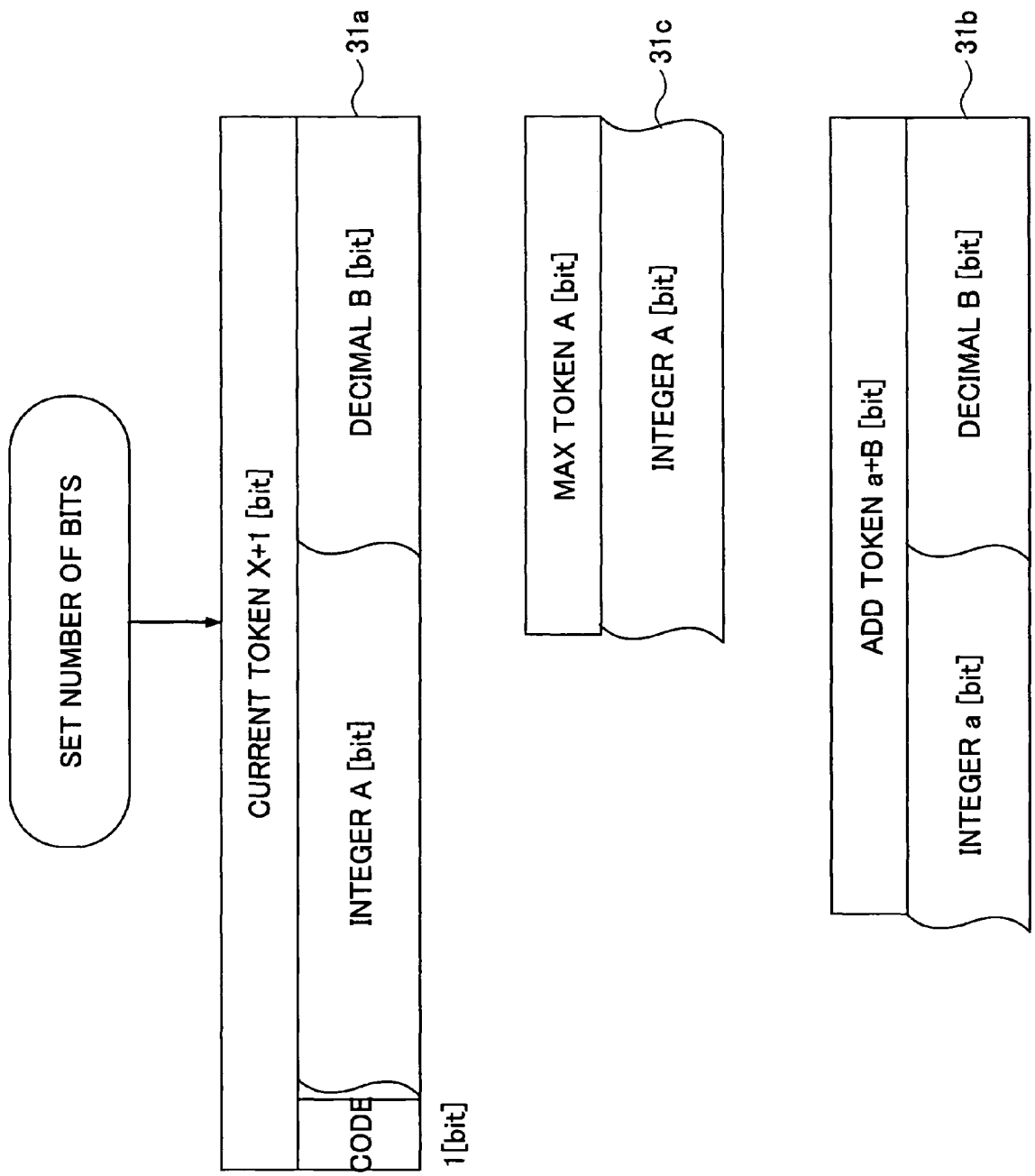
FIG. 6 is a schematic diagram for describing a current token, an add token, and a max token according to an embodiment of the present invention.

As shown in FIG. 6, the current token 31$a$ includes a code part (1 bit), an integer part "A" (A bits), and a decimal part "B" (B bits). The total number of bits of the current token 31$a$ is a fixed value of (X+1) bits. The value of B may be arbitrarily set. The value of A is defined by the values of X and B (A+B=X).

The add token 31$b$ includes an integer part "a" (a bits) which is obtained by calculating the upper limit of the shaping rate (A≧a), and a decimal part "B" (B bits) which has a value equal to the number of bits in a decimal part of the current token 21$a$. The value of "a" may be arbitrarily set.

The max token 31$c$ includes an integer part A which has a value equal to the number of bits in the integer part of the current token 31$a$.

<Settings and Operation>

Figure 7:
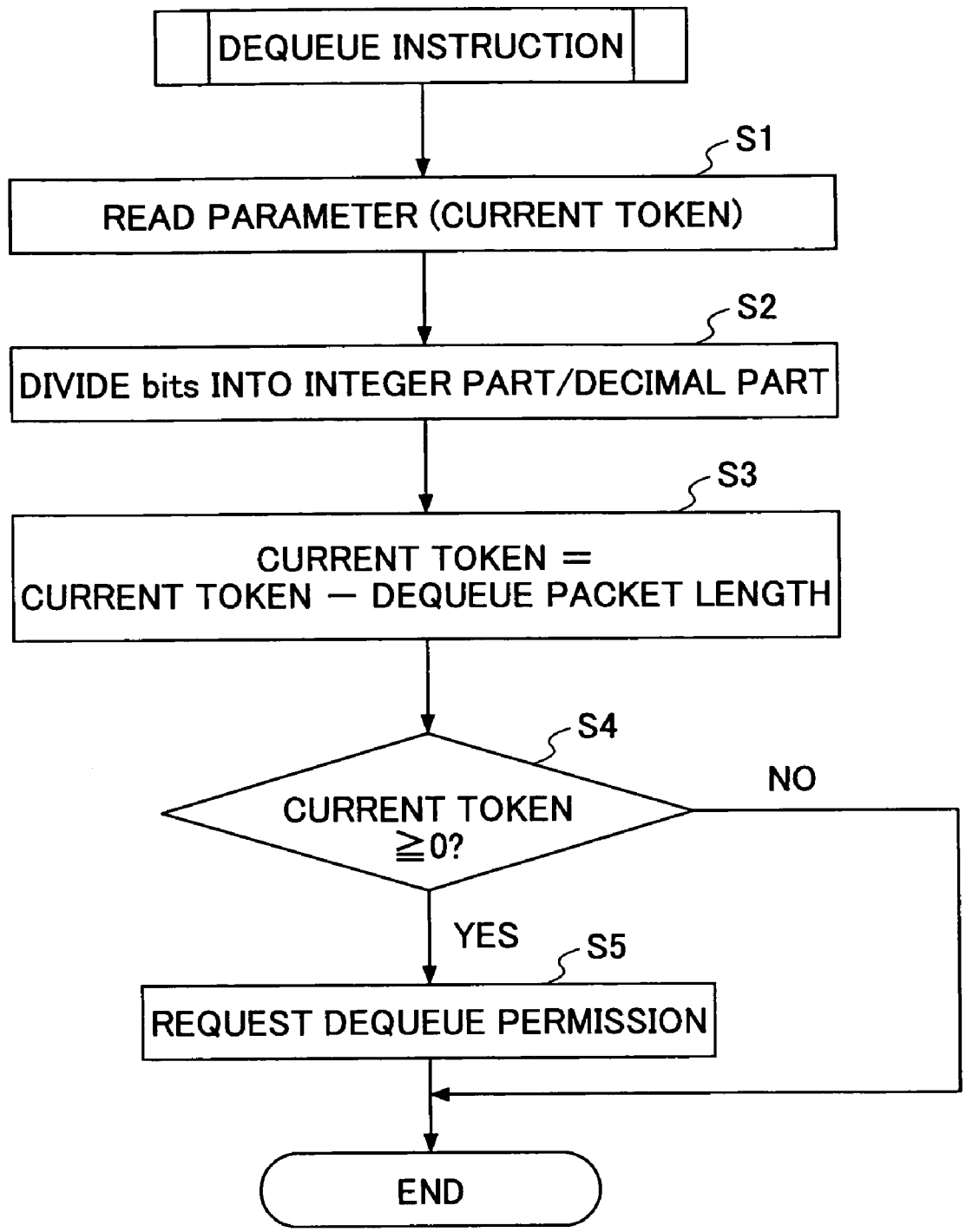
FIG. 7 is a flowchart showing a dequeue operation according to an embodiment of the present invention.
Figure 8:
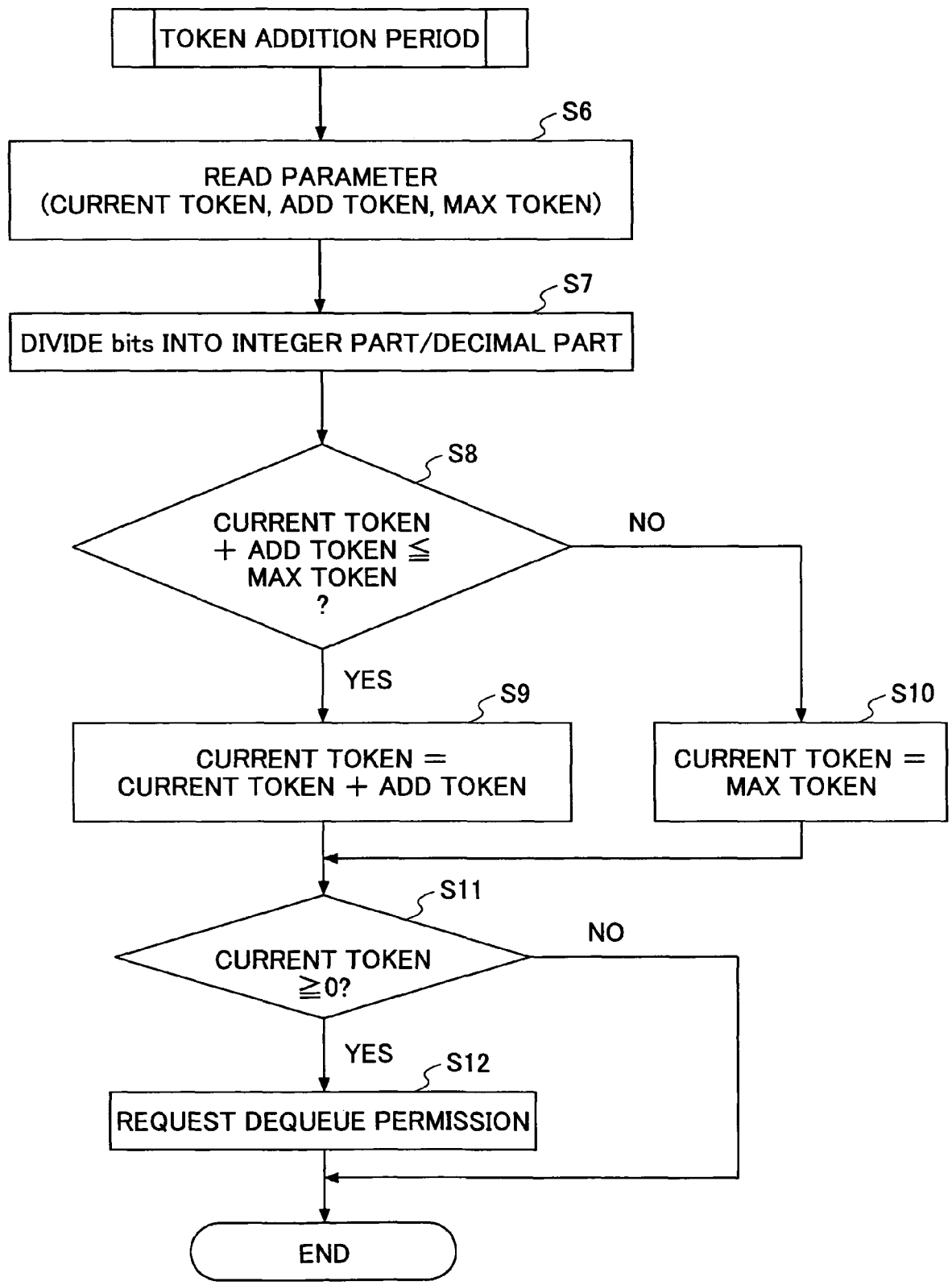
FIG. 8 is a flowchart showing a token addition operation according to an embodiment of the present invention.

FIG. 7 is a flowchart showing a dequeue operation according to an embodiment of the present invention. FIG. 8 is a flowchart showing a token addition operation according to an embodiment of the present invention. In this example, the number of bits of the current token 31 included in the shaper circuit 30 is 16 bits. The dequeue target (packet) on which the dequeue is performed has a length of 14 bits.

Accordingly, the current token 31$a$ is set with a value that satisfies a relationship of [B=2] in a case where the 16 bit current token 31$a$ has an integer part A of 14 bits and a decimal part B of 2 bits. Furthermore, the add token 31$b$ is set with a value that satisfies a relationship of [a=10] in a case where the integer part B of the add token 31$b$ is 10 bits. By assigning the two set values, the number of bits can be defined for each of the current token 31$a$, the add token 31$b$, and the max token 31$c$. It is to be noted that actual values are set (assigned) to the add token 31$b$ and the max token 31$c$ along with setting the values of B and a.

In Step S1 of FIG. 7, required parameters (B=2, a=10) are read in accordance with a dequeue instruction.

In Step S2, the decimal part B becomes 2 bits (B=2) and the integer part becomes 14 bits (A=12) in a case where X=16.

In Step S3, the dequeue subtraction part 32$a$ subtracts the length of the dequeue packet from the value of the integer part of the current token 31$a$.

In Step S4, the dequeue permission determining part 32$d$ determines whether the value of the current token 31$a$ is 0 or more.

In Step S5, a dequeue permission request is output only when it is determined that the value of the current token 31*a* is 0 or more.

In Step S6 of FIG. 8, required parameters (current token 31*a*, add token 31*b*, max token 31*c*) are read in the token addition period.

In Step S7, the bits of the current token 31*a* and the bits of the add token 31*b* are divided into the integer part and the decimal part, respectively. The integer part "A" equals 14 in a case where the total bit number X equals 16 (X=16) and the decimal part "B" equals 2 (B=12). The bit number of the add token 31*b* is also recognized since "a" equals to 10 (a=10).

In Step S8, the add token addition part 21*b* adds the add token 31*b* to the current token 31*a*. After the add token 31*b* is added to the current token 31*a*, the current token 31*a* with the add token 31*b* added is compared with a max token 31*c* by the max token comparison part 32*c*.

In Step S9, in a case where the value of the current token 31*a* with the add token 31*b* added is no greater than the value of the max token 31*c* according to the comparison in Step S8, the value of the current token 31*a* with the add token 31*b* added is used as the next current token 31*a*.

In Step S10, in a case where the value of the current token 31*a* added with the add token 31*b* is greater than the value of the max token 31*c* according to the comparison in Step S8, the value of the max token 31*c* is used as the next current token 31*a*. However, all bits in the decimal part are 0.

In Step S11, the dequeue permission determining part 32*d* determines whether the above-described current token 31*a* is no less than 0.

In Step S12, the dequeue permission request is output only when the current token 31*a* is determined to be no less than 0 in Step S11.

Accordingly, the shaper circuit 30 according to an embodiment of the present invention can be satisfactorily used in accordance with the band and/or the precision requested for the transmission apparatus by changing the bit numbers of the integer part and the decimal part of the parameters of the shaper circuit (the current token 31*a* and the add token 31*b*).

Second Embodiment

Figure 9:
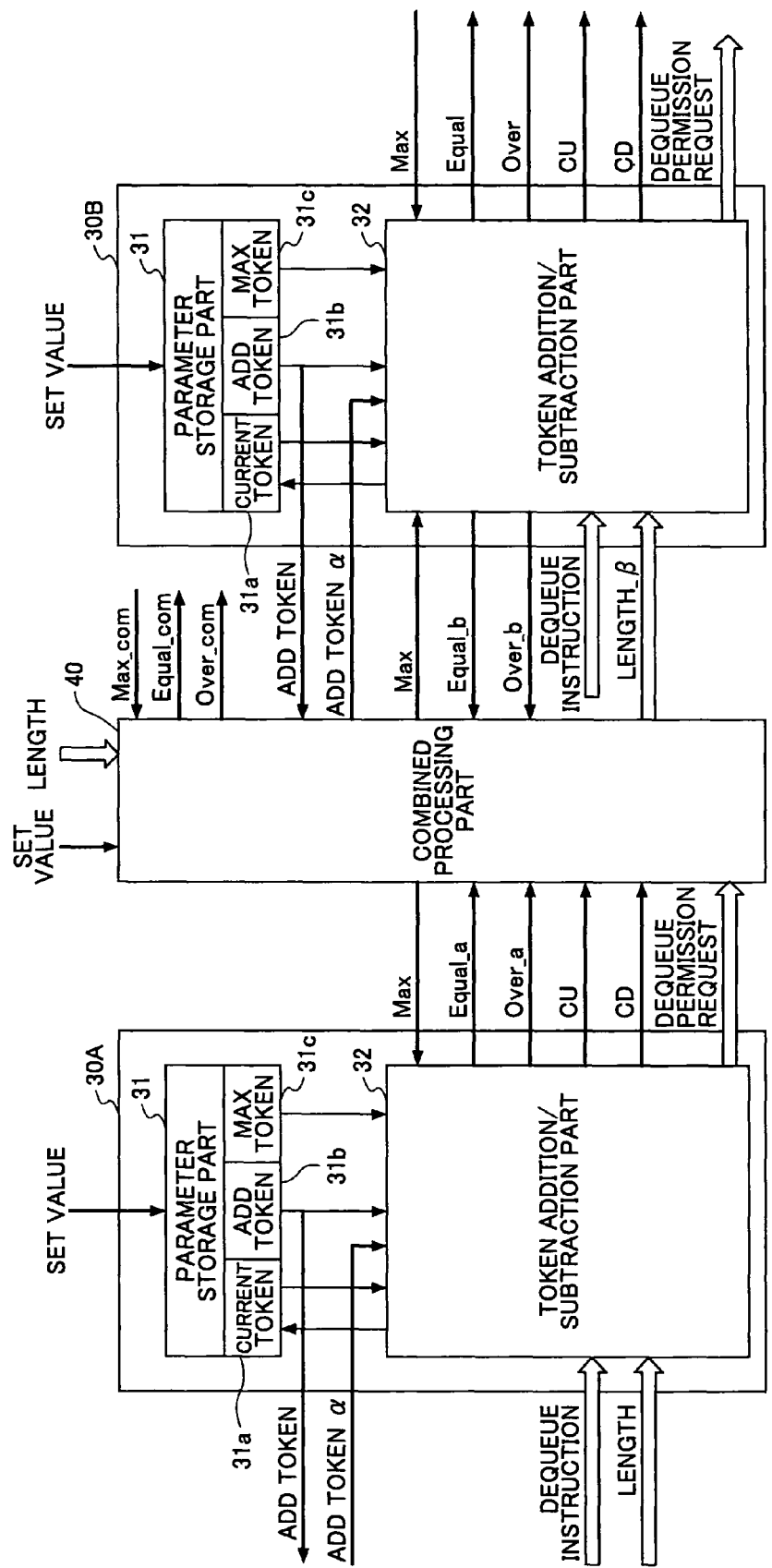
FIG. 9 is a block diagram showing a shaper circuit combination according to the second embodiment of the present invention.

FIG. 9 is a block diagram showing an exemplary configuration of a shaper circuit combination according to a second embodiment of the present invention. Two shaper circuits 30 (30A, 30B in the second embodiment) described in the first embodiment are connected with a single combined processing circuit (combined processing part) 40.

The add token addition part inside the token addition/subtraction part 32 of the shaper circuit 30 sends a 1 bit signal indicative of a carry up during the add token period (carry up CU) to the combined processing circuit 40. Furthermore, the dequeue subtraction part 32*a* sends a 1 bit signal indicative of a carry down during length subtraction according to a dequeue instruction (carry down CD) to the combined processing circuit 40.

Figure 10:
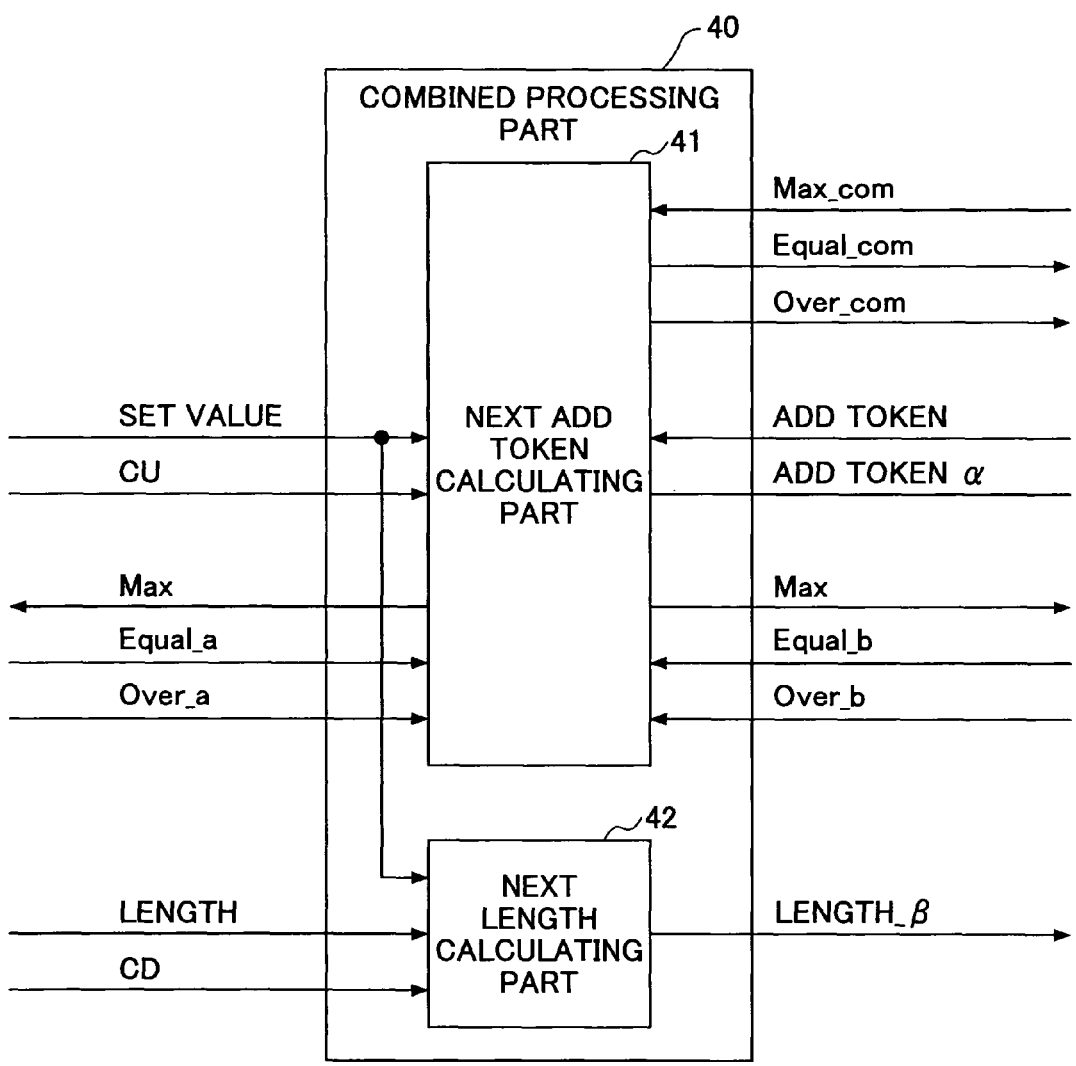
FIG. 10 is a schematic diagram showing an exemplary configuration of a combined processing circuit according to an embodiment of the present invention.

FIG. 10 is a schematic diagram showing an exemplary configuration of the combined processing part 40 according to an embodiment of the present invention. The combined processing part 40 shown in FIG. 10 includes a next length calculating part 41 and a next add token calculating part 42.

The next length calculating part 41 adds the carry down CD sent from the shaper circuit 30A to the length input to the combined processing circuit 40, to thereby obtain a length β. The calculated length β is sent to the shaper circuit 30B.

The next add token calculating part 42 adds the carry up CU sent from the shaper circuit 30A to the add token 31*b* sent from the shaper circuit 30B, to thereby obtain an add token α which is to be actually used. The calculated add token α is sent to the shaper circuit 30B.

Furthermore, the next add token calculating part 42 generates a Max signal in accordance with an Equal_a signal and an Over_a signal sent from the shaper circuit 30A and an Equal_b signal and an Over_b signal sent from the shaper circuit 30B by referring to a determination table. The Max signal is for instructing that the value of the current token is to be equal to the value of the max token. The generated Max signal is sent to the shaper circuits 30A and 30B.

The shaper circuit 30B, which is connected to the combined processing circuit 40, does not directly refer to the value of the add token 31*b* stored in the parameter storage part 31 but instead uses the new add token α (which is added to the carry up CU in the combined processing part 40). Likewise, the shaper circuit 30B uses the new length β (which is added to the carry down CD) as the subtraction target.

In the token addition period, the current token having been added to the add token is compared with the max token in a manner described below. The shaper circuit 30A sends an "Equal_a" signal indicating (Equal_a=1) to the combined processing circuit 40 in a case where the current token is equal to the max token (current token=max token). The shaper circuit 30A sends an "Over_a" signal indicating (Over_a=1) to the combined processing circuit 40 in a case where the current token is greater than the max token (current token>max token).

Likewise, the shaper circuit 30B sends an "Equal_b" signal indicating (Equal_b=1) to the combined processing circuit 40 in a case where the current token is equal to the max token (current token=max token). The shaper circuit 30B sends an "Over_b" signal indicating (Over_b=1) to the combined processing circuit 40 in a case where the current token is greater than the max token (current token>max token).

The combined processing circuit 40 determines whether the value of the max token (max token value) is to be the value of the current token (current token value) based on the received "Equal_a" signal, the "Over_a" signal, the "Equal_b" signal, and the "Over_b" signal. In a case where the combined processing circuit 40 determines that the max token value is to be the current token value, the combined processing circuit 40 sends a Max signal indicating (Max=1) to the shaper circuits 30A and 30B.

In a case of, for example, connecting three or more shaper circuits, another additional combined processing circuit is connected to the shaper circuit 30B (on the right side in FIG. 9) and the third shaper circuit is connected to the additional combined processing circuit. In this exemplary case, the "Equal_a" signal and the "Over_a" signal from the combined processing circuit 40 are sent to the additional combined processing circuit as an "Equal_com" signal and an "Over_com" signal. In response to the received signals, the additional combined processing circuit sends a "Max_com" signal as a Max signal to the combined processing circuit 40.

In FIG. 9, the entire current token includes a code part (1 bit), a SA bit integer part (SA bits), and a SB bit decimal part (SB bits). The value of SB may be arbitrarily set. The value of SA is defined by a fixed number of bits 2X and the arbitrarily set SB (SA+SB=2X). The number of bits of the entire current token equals to the sum 2X of the fixed number of bits X of the current token 31*a* in the shaper circuit 30A and the fixed number of bits X of the current token 31*a* in the shaper circuit 30B.

The entire max token includes an SA bit integer part (SA bits) having an equal number of bits as the integer part of the entire current token. The total number of bits SA of the entire max token satisfies a relationship of (SA=A1+A2) in a case where "A1" is the number of bits of the integer part of the shaper circuit 30A and "A2" is the number of bits of the integer part of the shaper circuit 30B.

The entire add token includes an Sa bit integer part (Sa bits) obtained from the upper limit of the shaping rate (SA≧Sa) and a SB bit decimal part (SB bits) having an equal number of bits as the decimal part of the entire current token. SB satisfies a relationship of (SB=B1+B2) in a case where "B1" is the number of bits of the decimal part (B bits) of the shaper circuit 30A and "B2" is the number of bits (B bits) of the decimal part of the shaper circuit 30B. The value of Sa may be arbitrarily set. Sa satisfies a relationship of (Sa=a1+a2) in a case where "a1" is the value of the shaper circuit 30A and "a2" is the value of the shaper circuit 30B.

<Settings and Operation>

Figure 11:
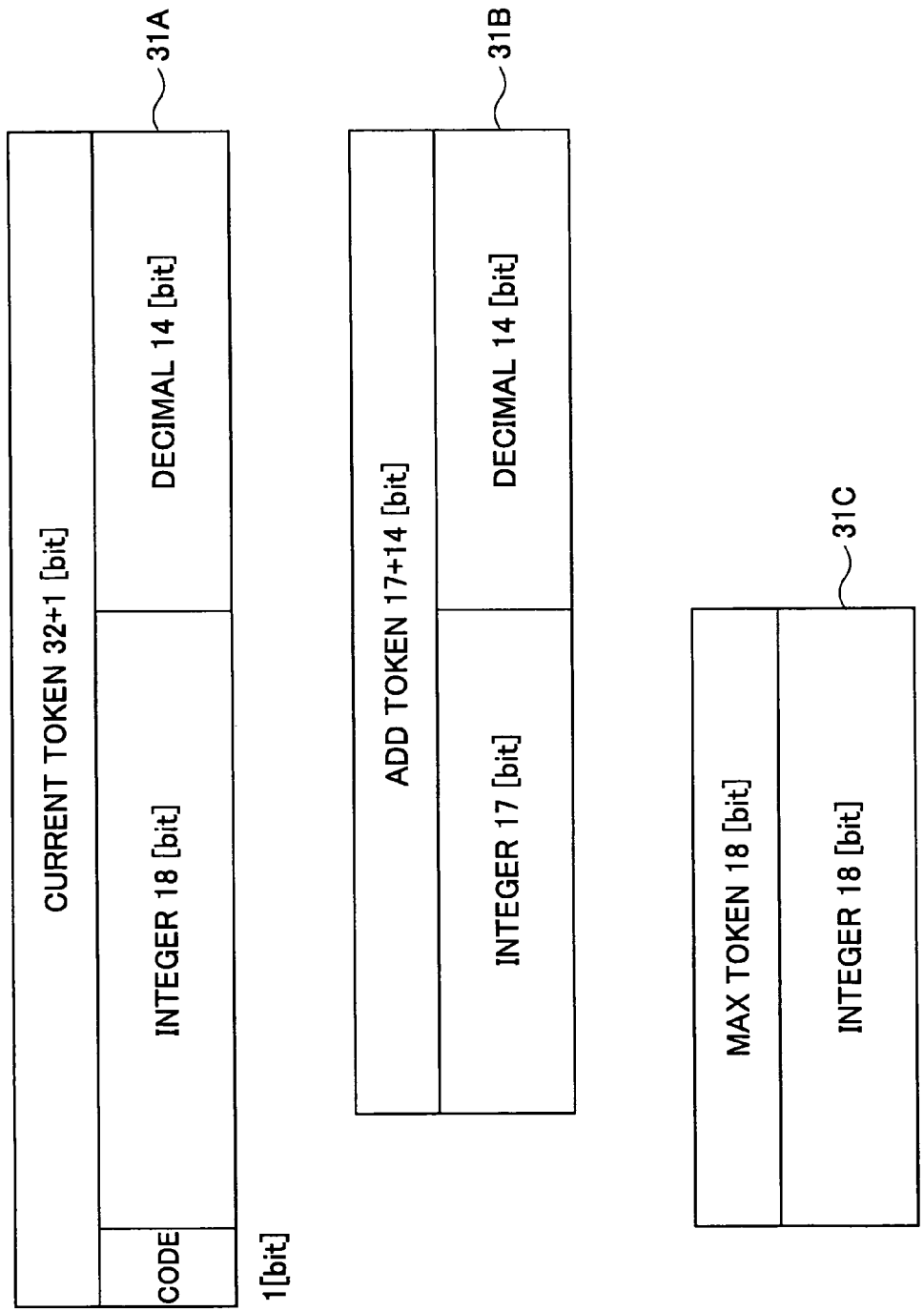
FIG. 11 is a schematic diagram for describing a current token, an add token, and a max token according to another embodiment of the present invention.
Figure 12:
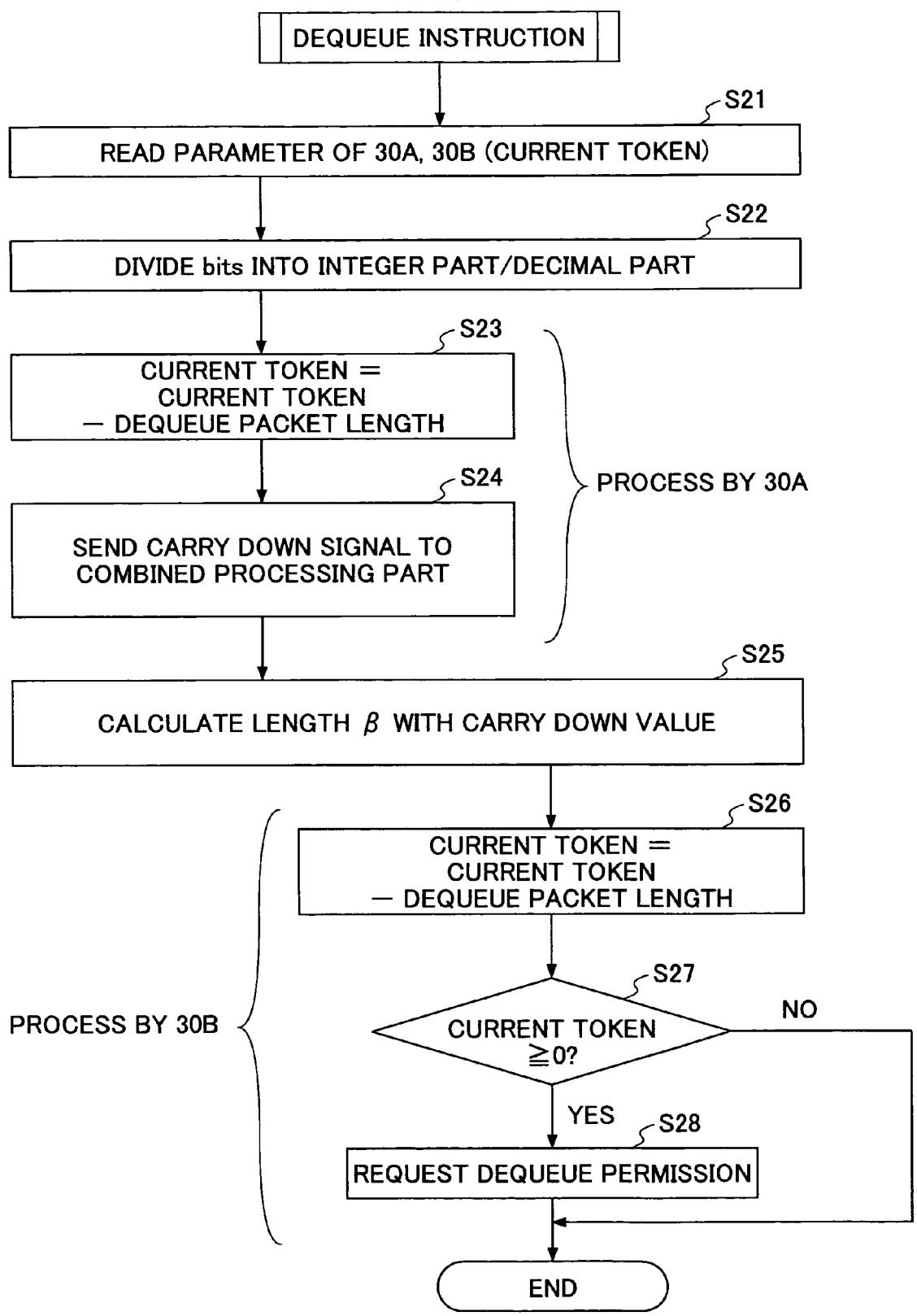
FIG. 12 is a flowchart showing a dequeue operation according to another embodiment of the present invention.
Figure 13:
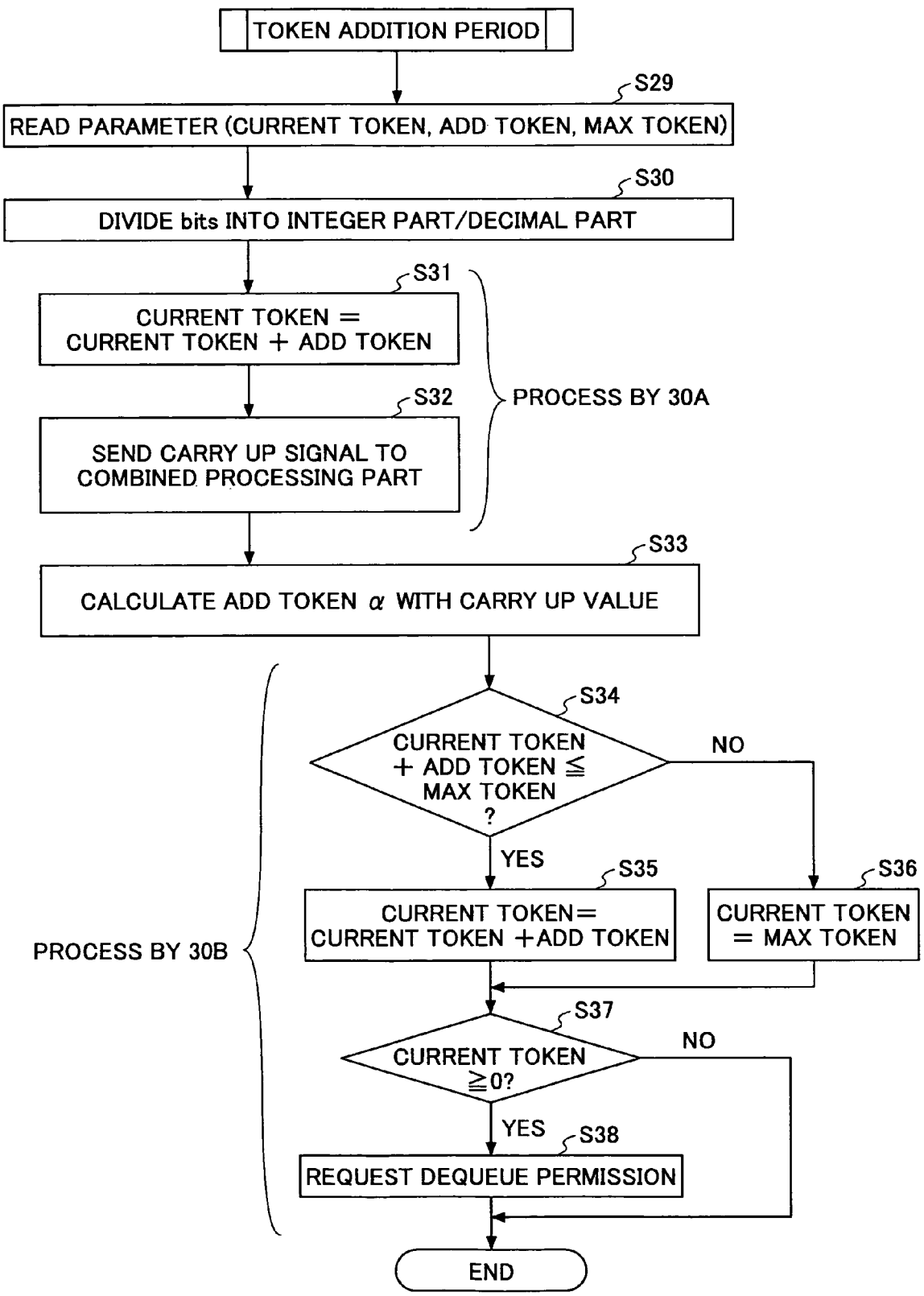
FIG. 13 is a flowchart showing a token addition operation according to another embodiment of the present invention.

FIG. 12 is a flowchart showing a dequeue operation according to an embodiment of the present invention. FIG. 13 is a flowchart showing a token addition operation according to an embodiment of the present invention. As shown in FIG. 11, the number of bits of the entire current token 31A is 2X (2X=16+16=32 bits). In this example, the dequeue packet has a length of 14 bits. The 32 bits of the entire current token 31A includes an SA integer part of 18 bits and an SB decimal part of 14 bits. The integer part Sa of the entire add token 31B is 17 bits. The number of bits of the entire max token 31C is 18 bits (=SA integer part). The values of SB and Sa are set from the outside.

The settings for the shaper circuits 30A and 30B are performed separately. The lower bits for each of the parameters are set in the shaper circuit 30A. Therefore, the set value B1 of the shaper circuit 30A is 14 (B1=14), the set value B2 of the shaper circuit 30B is 0 (B2=0), the set value a1 of the shaper circuit 30A is 2 (a1=2), and the set value a2 of the shaper circuit 30B is 15 (a2=15) The set values of the shaper circuits 30A and 30B are added in the combined processing circuit 40. As a result, SX is 32 (SX=32), SB is 14 (SB=14), and Sa=17. In addition to setting the values of B1, B2, a1, and a2, the actual values of the add token 31b and the max token 31c for the shaper circuits 30A and 30b are also set.

In Step S21 of FIG. 12, required parameters (current token) of the shaper circuits 30A and 30B are read in accordance with a dequeue instruction.

In Step S22, the bits of the current token in the shaper circuit 30A are divided into a decimal part B1 of 14 bits (B1=14) and an integer part A1 of 2 bits (A1=2) in a case where the number of bits X1 is 16 (X=16). The bits of the current token in the shaper circuit 30B are divided into a decimal part B2 of 0 bits (B2=0) and an integer part A2 of 16 bits (A2=16) in a case where the number of bits X2 is 16 (X=16).

In Step S23, the dequeue subtraction part 32a of the shaper circuit 30A subtracts the length of the dequeue packet from the value of the integer part A1 of the current token.

In Step S24, the shaper circuit 30A sends a carry down (CD) bit of the dequeue subtraction part 32a to the combined processing part 40.

In Step S25, the combined processing part 40 sends a length β (length added with the carry down CD) to the shaper circuit 30B.

In Step S26, the dequeue subtraction part 32a of the shaper circuit 30B subtracts the length β of the dequeue packet from the value of the integer part A2 of the current token.

In Step S27, the dequeue permission determining part 32d of the shaper circuit 30B determines whether the value of the current token is 0 or more.

In Step S28, a dequeue permission request is output from the dequeue permission part 32d only when it is determined that the value of the current token is 0 or more.

In Step S29 of FIG. 13, required parameters (current token, add token, max token) of the shaper circuits 30A and 30B are read in the token addition period.

In Step S30, the bits of the current token in the shaper circuit 30A are divided into a decimal part B1 of 14 bits (B1=14) and an integer part A1 of 2 bits (A1=2) in a case where the number of bits X1 is 16 (X=16). The bit number of the add token is also recognized since "a1" equals 2 bits (a1=2). The bits of the current token in the shaper circuit 30B are divided into a decimal part B2 of 0 bits (B2=0) and an integer part A2 of 16 bits (A2=16) in a case where the number of bits X2 is 16 (X=16). The bit number of the add token is also recognized since "a2" equals 15 bits (a2=15).

In Step S31, the add token addition part 32b of the shaper circuit 30A adds the add token 31b to the current token 31a.

In Step S32, the shaper circuit 30A sends a carry up (CU) bit of the add token addition part 32a to the combined processing part 40.

In Step S33, the combined processing part 40 sends an add token α (add token 31b of the shaper circuit 30B with the carry up CU added) to the shaper circuit 30B.

In Step S34, the add token addition part 31a of the shaper circuit 30B adds the add token α to the current token 21a. The max token comparison part 32c of the shaper circuit 30B compares the current token 31a (current token 21a with the add token α added) with the max token 31c.

The shaper circuit 30A sends an "Equal_a" signal indicating (Equal_a=1) to the combined processing circuit 40 in a case where the current token 31a is equal to the max token 31c (current token 31a=max token 31c). The shaper circuit 30A sends an "Over_a" signal indicating (Over_a=1) to the combined processing circuit 40 in a case where the current token 31a is greater than the max token 31c (current token 31a>max token 31c).

Likewise, the shaper circuit 30B sends an "Equal_b" signal indicating (Equal_b=1) to the combined processing circuit 40 in a case where the current token 31a is equal to the max token 31c (current token 31a=max token 31c). The shaper circuit 30B sends an "Over_b" signal indicating (Over_b=1) to the combined processing circuit 40 in a case where the current token 31a is greater than the max token 31c (current token 31a>max token 31c).

The combined processing circuit 40 uses a determination table shown in FIG. 14 and determines whether the value of the max token 31C (max token value) is the value of the current token 31A (current token value) of the shaper circuits 30A and 30B based on the received "Equal_a" signal, the "Over_a" signal, the "Equal_b" signal, and the "Over_b" signal. In a case where the combined processing circuit 40 determines that the max token value 31C is the current token value 31A, the combined processing circuit 40 sends a Max signal indicating (Max=1) to the shaper circuits 30A and 30B.

In Step S35, in a case where the value of the current token 31a (current token with add token a added in the shaper circuit 30B) is no greater than the value of the max token 31c according to the comparison in Step S34, the value of the current token 31a is used as the value of the next current token.

In Step S36, in a case where the value of the current token 31a (current token with the add token α added in the shaper circuit 30B) is greater than the value of the max token 31c according to the comparison in Step S34, the value of the max token 31c is used as the value of the next current token. However, all bits in the decimal part are 0.

In Step S37, the dequeue permission determining part 32d of the shaper circuit 30B determines whether the above-described current token 31a is no less than 0.

In Step S38, the dequeue permission request is output from the dequeue permission determining part 32d only when the current token 31a is determined to be no less than 0 in Step S37.

Accordingly, the number of bits of the parameters in the shaper circuit of the first embodiment of the present invention can be doubled. Thus, the shaper circuit of this embodiment can be more satisfactorily used in accordance with the band and/or the precision requested for the transmission apparatus. Furthermore, the shaper circuit can be used in cases where the numbers of bits of the parameters are increased by using n shaper circuits and connecting the n shaper circuits with (n−1) combined processing circuits 40. Thereby, the shaper circuits can be flexibly used for various conditions (e.g. precision, bandwidth) of various transmission apparatuses as well as newly developed transmission apparatuses. Accordingly, the shaper circuit according to an embodiment of the present invention will not need design modifications whenever a new transmission apparatus is developed. Thus, the development period can be shortened.

<Leaky Bucket Algorithm>

Figure 15:
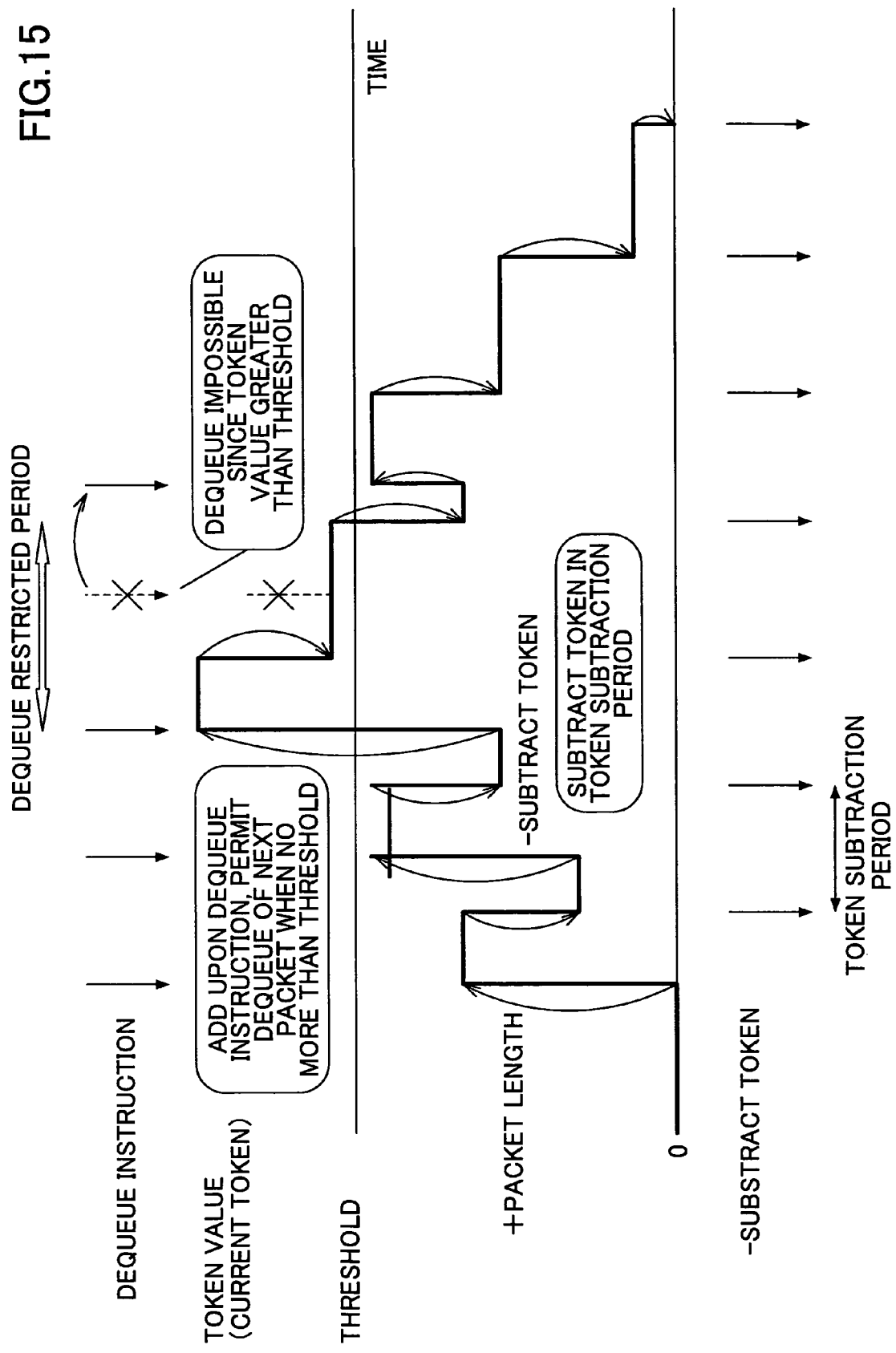
FIG. 15 is a schematic diagram for describing a leaky bucket algorithm.

Next, an example of a leaky bucket algorithm is described with reference to FIG. 15. In this algorithm, a packet length is added to a token during a dequeue process, and a value of a sub token is subtracted during a token subtraction period. The shaping rate R is calculated by the token subtraction period and the the sub token value. Furthermore, there is a threshold value for the tokens that can be accumulated for limiting the burst, in which the maximum value of the current token is threshold value+maximum packet length. If the there are more packets beyond the maximum value, the packets are discarded.

The shaper circuit stores packet information in queues in an enqueue operation and dequeues when the packet information is accumulated. In the dequeue operation, a packet length is added to a token. A sub token value is subtracted during a token subtraction period.

It is determined whether to dequeue a next enqueue packet by referring to the result of the token addition process or the periodic token subtraction of a previous dequeue packet (dequeue packet immediately before the next enqueue packet). In a case where the result of the token addition process is less than a threshold value, the next dequeue is possible. The next dequeue is also possible when the periodic token subtraction of a previous dequeue packet is greater than 0.

It is determined whether dequeuing is possible upon enqueuing. If it is determined that dequeuing is possible, a dequeue permission request is output. In a case where there is a dequeue instruction in response to the dequeue permission request, a packet length is added to the next dequeue target (token). The determination is again conducted based on whether the addition result is less than the value of a predetermined threshold.

Third Embodiment

Figure 16:
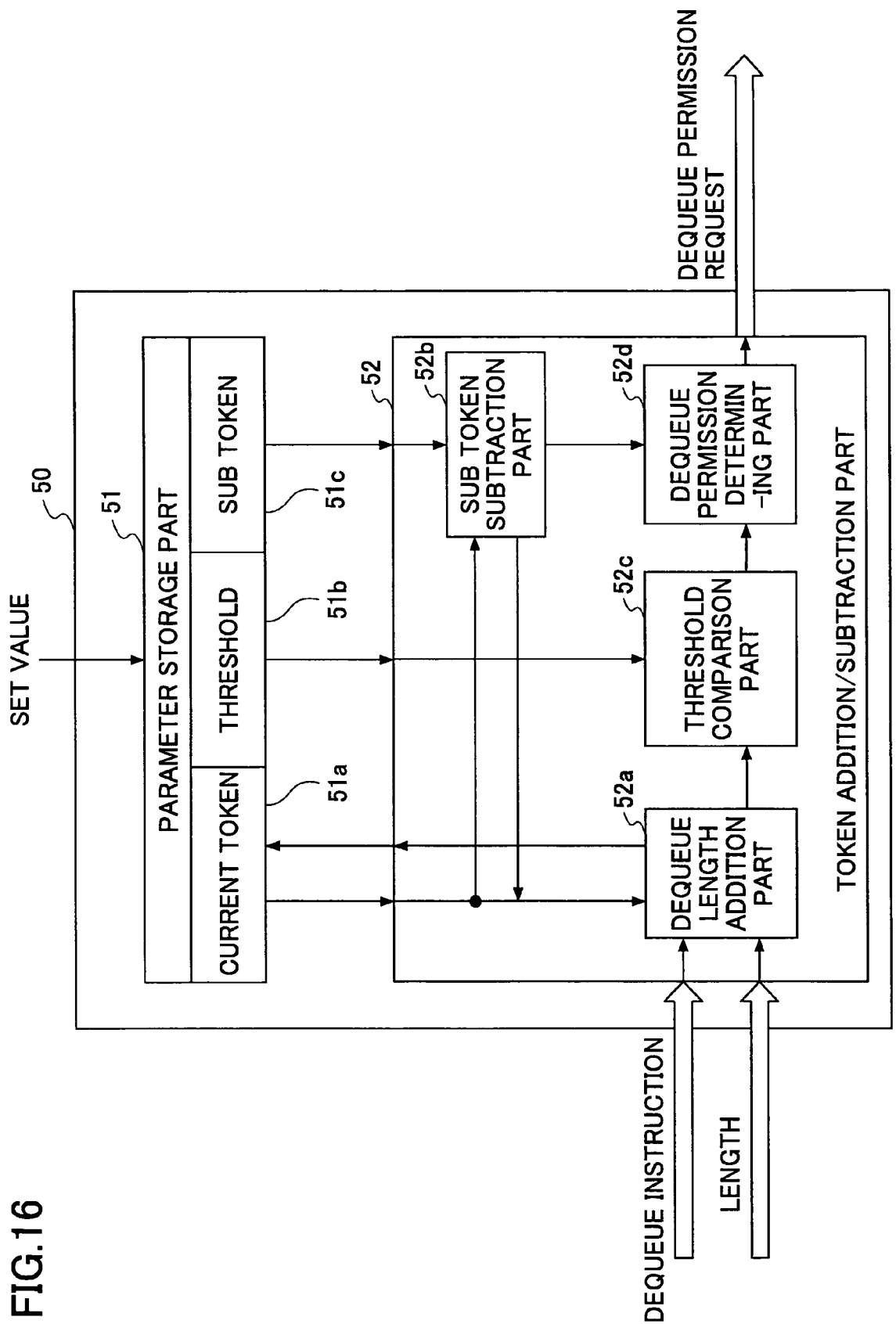
FIG. 16 is a schematic diagram showing an exemplary configuration of a shaper circuit according to the third embodiment of the present invention.

FIG. 16 is a block diagram showing an exemplary configuration of a shaper circuit according to the third embodiment of the present invention. In FIG. 16, the shaper circuit 50 includes a parameter storage part 51 and a token addition/subtraction part 52 serving as one of the central parts of the shaper circuit 50. The parameter storage part 51 stores variable parameters including a current token 51a, a threshold 51b, and a sub token 51c. The token addition/subtraction part 52 includes a dequeue addition part 52a, a sub token subtraction part 52b, a threshold comparison part 52c, and a dequeue permission determining part 52d.

Figure 17:
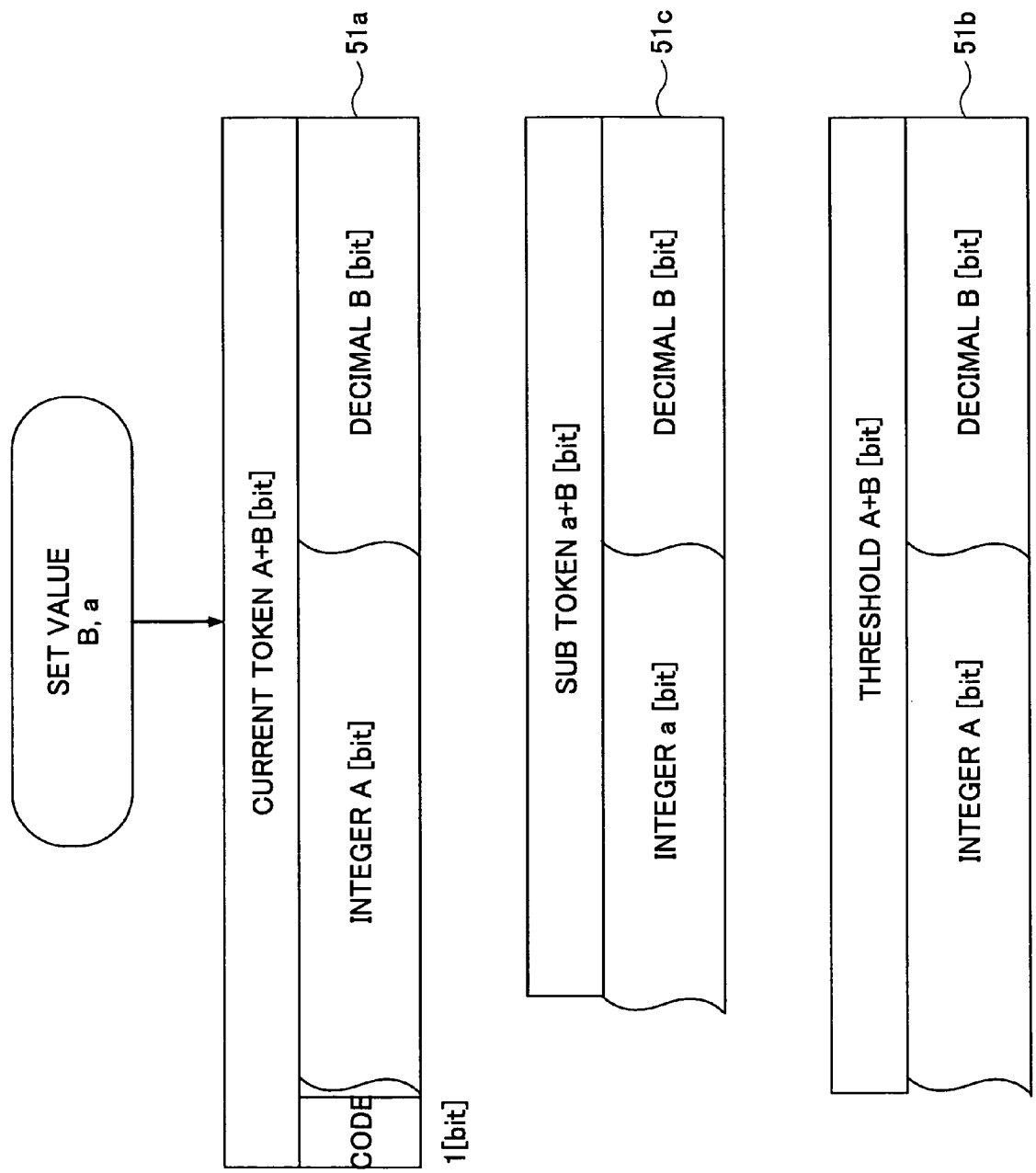
FIG. 17 is a schematic diagram for describing a current token, a sub token, and a threshold according to an embodiment of the present invention.

As shown in FIG. 17, the current token 51a includes a code part (1 bit), an A bit integer part (A bits), and a B bit decimal part (B bits). The number of bits of the current token 51a is a fixed value which is expressed as (X+1) bits. The value of B may be arbitrarily set. The value of A is defined by the value of X and the value of B (A+B=X).

The threshold 51b has a bit number that is equal to the number of bits of the integer part A and the decimal part B of the current token 51a. The sub token 51c includes an "a" integer part (a bits) that is set according to the maximum shaping rate and a "B" decimal part (B bits) which is equal to the bits of the decimal part of the current token 51a. The value of a may be arbitrarily set.

<Settings and Operation>

Figure 18:
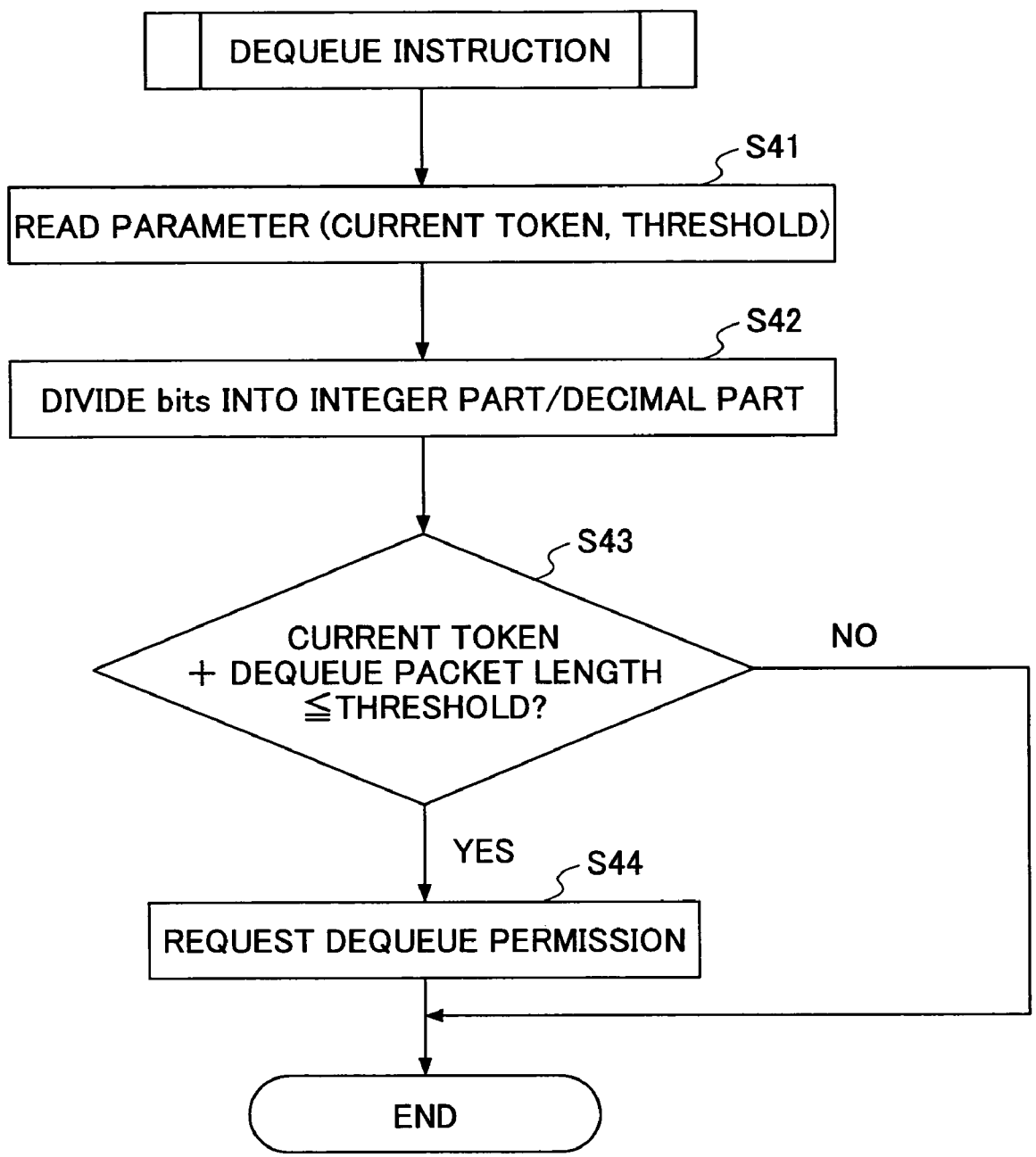
FIG. 18 is a flowchart showing a dequeue operation according to yet another embodiment of the present invention.
Figure 19:
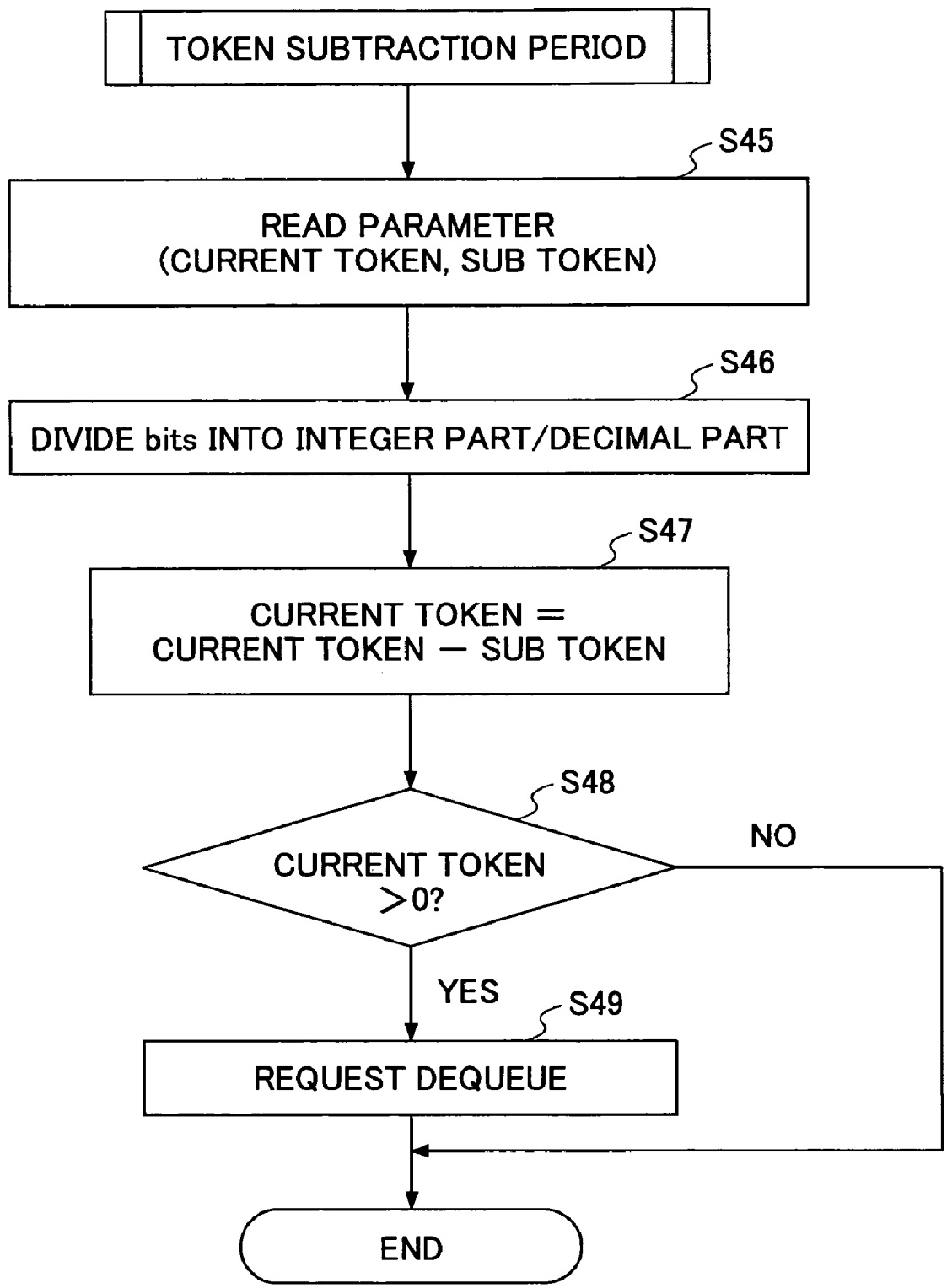
FIG. 19 is a flowchart showing a token subtraction operation according to an embodiment of the present invention.

FIG. 18 is a flowchart showing a dequeue operation according to another embodiment of the present invention. FIG. 19 is a flowchart showing a token subtraction operation according to an embodiment of the present invention. In this example, the number of bits X of the current token 51a is 16 bits. The length of the dequeue packet is 14 bits.

In a case where the integer part of the current token 51a is 14 bits and the decimal part of the current token 51a is 2 bits, "B" is set with a value of 2 (B=2). Furthermore, in a case where the integer part of the sub token 51c is 10 bits, "a" is set with a value of 10 (a=10). By setting the values of "B" and "a", the bit numbers for each of the current token 51a, the threshold 51b, and the sub token 51c can be defined. In addition to setting the values of "B" and "a", the actual values of the threshold 51b and the sub token 51c are also set.

In Step S41 of FIG. 18, required parameters (current token, threshold) are read in accordance with a dequeue instruction.

In Step S42, the decimal part B becomes 2 bits (B=2) and the integer part becomes 14 bits (A=12) in a case where X=16.

In Step S43, the dequeue length addition part 52a adds the length of the dequeue packet to the current token 51a. After the length is added to the current token 51a, the threshold comparison part 52c compares a threshold with the current token 51a.

In Step S44, a dequeue permission request is output when the current token 51a is no greater than the threshold according to the comparison of Step S43.

In Step S45 shown in FIG. 19, required parameters (current token, sub token) are read in the token subtraction period.

In Step S46, the integer part "A" equals 14 in a case where the total bit number X equals 16 (X=16) and the decimal part "B" equals 2 (B=12). The bit number of the sub token is also recognized since "a" equals to 10 (a=10).

In Step S47, the sub token subtraction part 52b subtracts the sub token 51c from the current token 51a.

In Step S48, the dequeue permission determining part 52d determines whether the current token 51a is greater than 0.

In Step S49, a dequeue permission request is output from the dequeue permission determining part 52d when the current token 51a is determined to be greater than 0 in Step S48.

Accordingly, the shaper circuit 50 according to an embodiment of the present invention can be satisfactorily used in accordance with the band and/or the precision requested for the transmission apparatus by changing the bit numbers of the integer part and the decimal part of the parameters of the shaper circuit 50.

Fourth Embodiment

Figure 20:
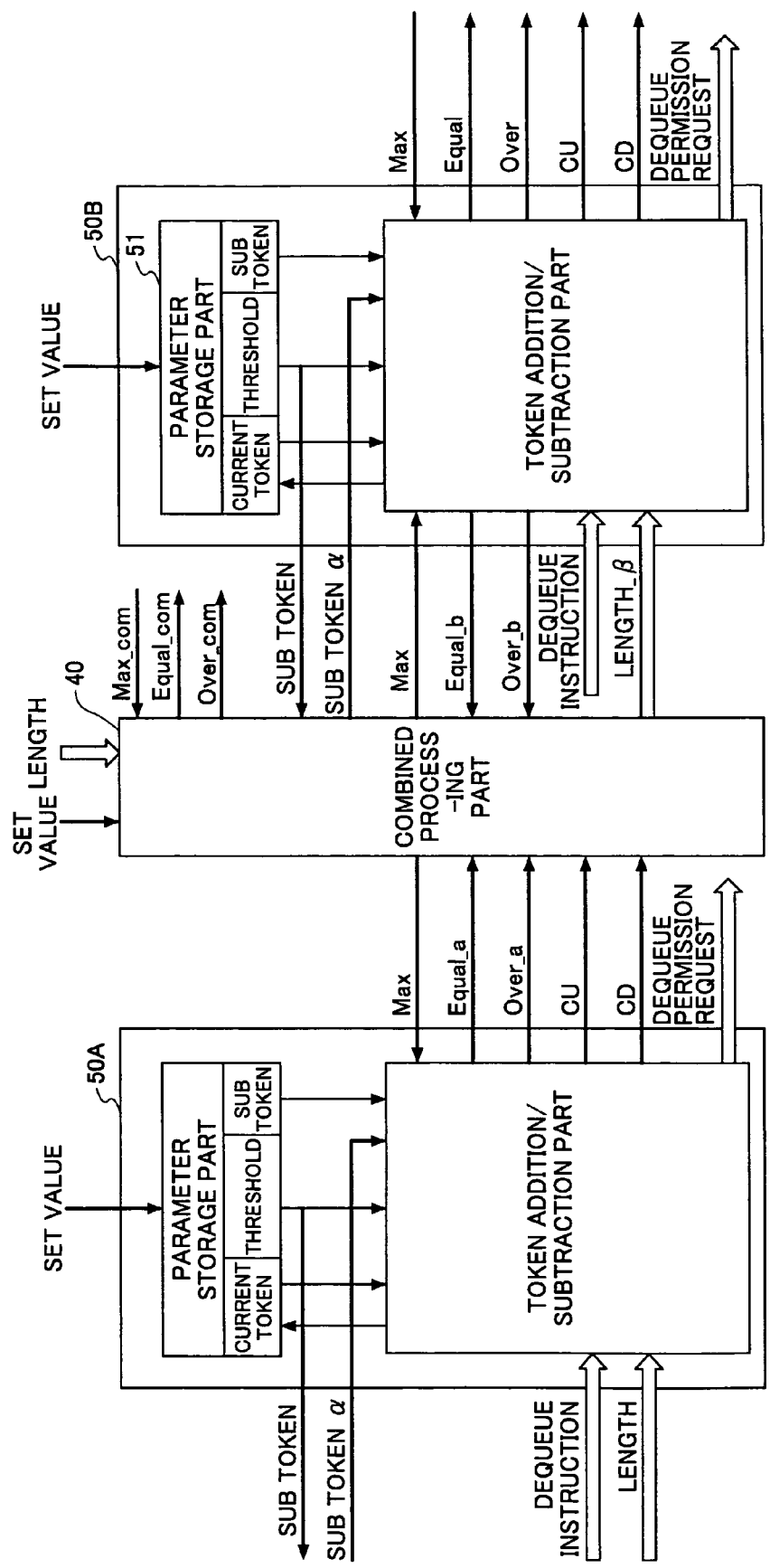
FIG. 20 is a block diagram showing a shaper circuit combination according to the fourth embodiment of the present invention.
Figure 21:
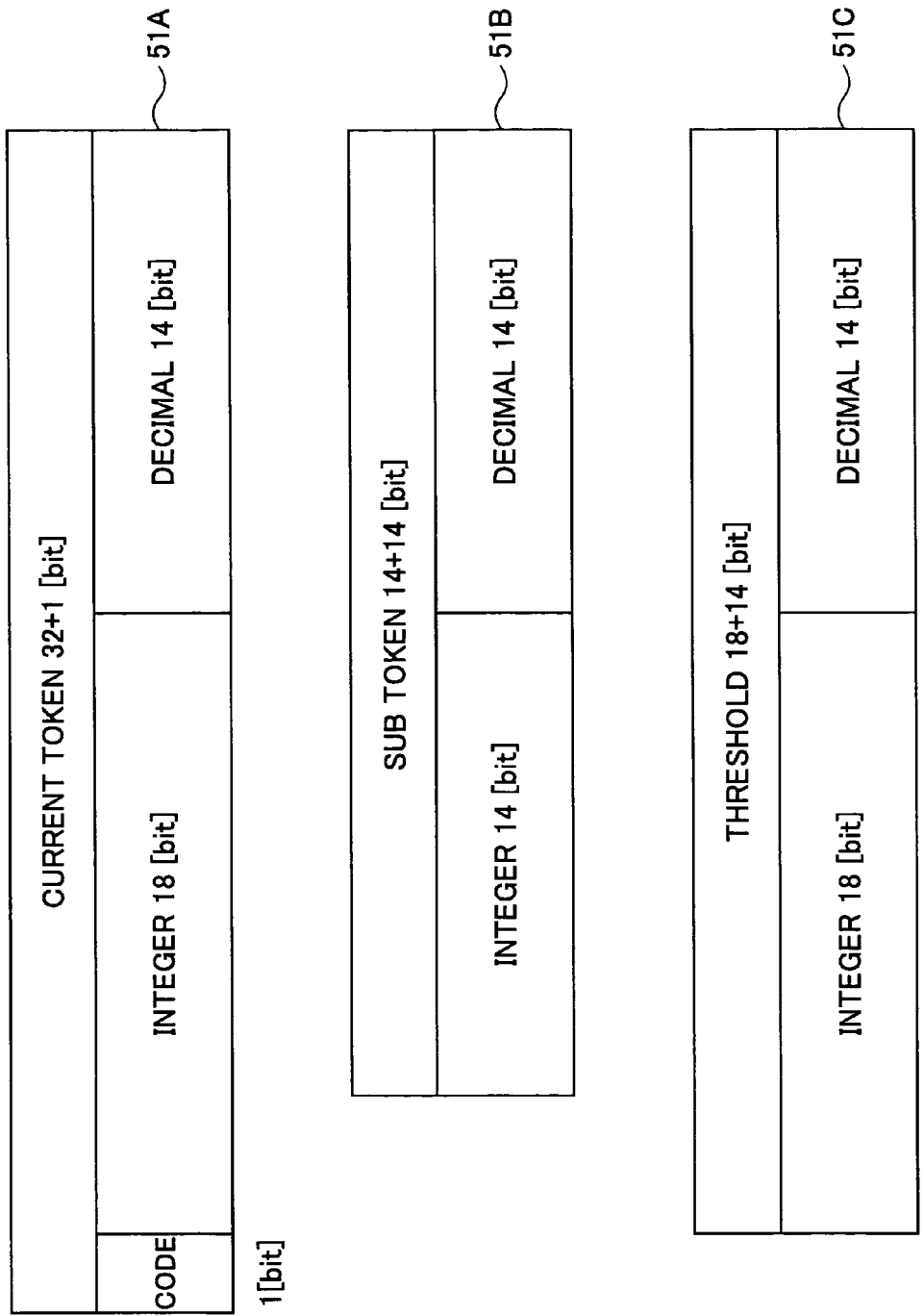
FIG. 21 is a schematic diagram for describing a current token, a sub token, and a threshold according to another embodiment of the present invention.

FIG. 20 is a block diagram showing an exemplary configuration of a shaper circuit combination according to a fourth embodiment of the present invention. Two shaper circuits 50 (50A, 50B in the fourth embodiment) described in the first embodiment are connected with a single combined processing circuit (combined processing part) 40.

The sub token subtraction part 52b inside the token addition/subtraction part 52 of the shaper circuit 50 sends a 1 bit signal indicative of a carry down during the token subtraction period (carry down CD) to the combined processing circuit 40. Furthermore, the dequeue length addition part 52a sends a 1 bit signal indicative of a carry up during length addition according to a dequeue instruction (carry up CU) to the combined processing circuit 40.

In the fourth embodiment, the entire current token includes a code part (1 bit), a SA bit integer part (SA bits), and a SB bit decimal part (SB bits). The value of SB may be arbitrarily set. The value of SA is defined by a fixed number of bits 2X and the arbitrarily set SB (SA+SB=2X). The number of bits of the entire current token equals the sum 2X of the fixed number of bits X of the current token 51a in the shaper circuit 50A and the fixed number of bits X of the current token 51a in the shaper circuit 50B.

The entire threshold includes an SA bit integer part (SA bits) having an equal number of bits as the integer part of the entire current token.

The entire sub token includes an Sa bit integer part (Sa bits) obtained from the upper limit of the shaping rate (SA≧Sa) and a SB bit decimal part (SB bits) having an equal number of bits as the decimal part of the entire current token. SB satisfies a relationship of (SB=B1+B2) in a case where "B1" is the number of bits of the decimal part (B bits) of the shaper circuit 50A and "B2" is the number of bits (B bits) of the decimal part of the shaper circuit 50B. The value of Sa may be arbitrarily set. Sa satisfies a relationship of (Sa=a1+a2) in a case where "a1" is the value of the shaper circuit 50A and "a2" is the value of the shaper circuit 50B.

<Settings and Operation>

Figure 22:
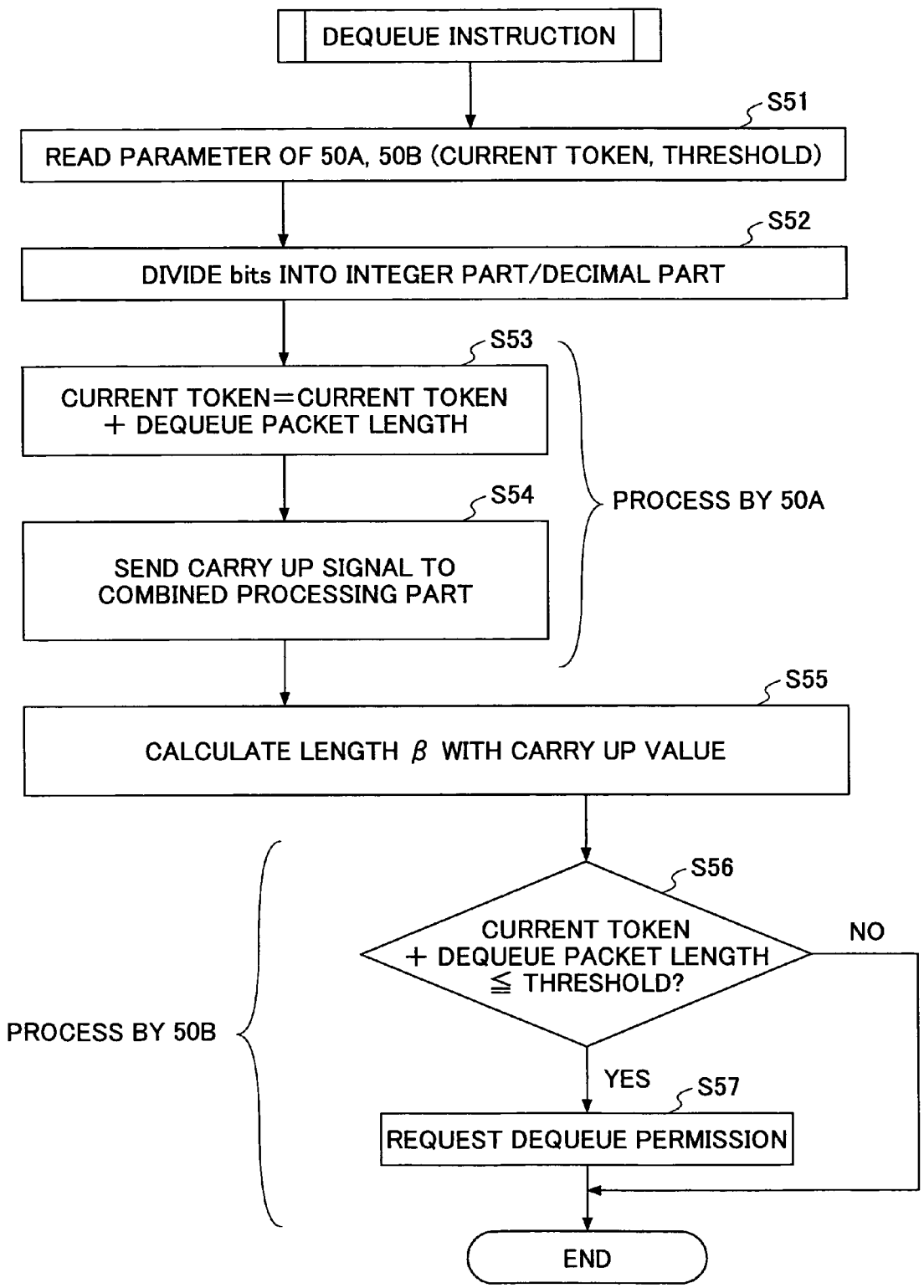
FIG. 22 is a flowchart showing a dequeue operation according to a further embodiment of the present invention.
Figure 23:
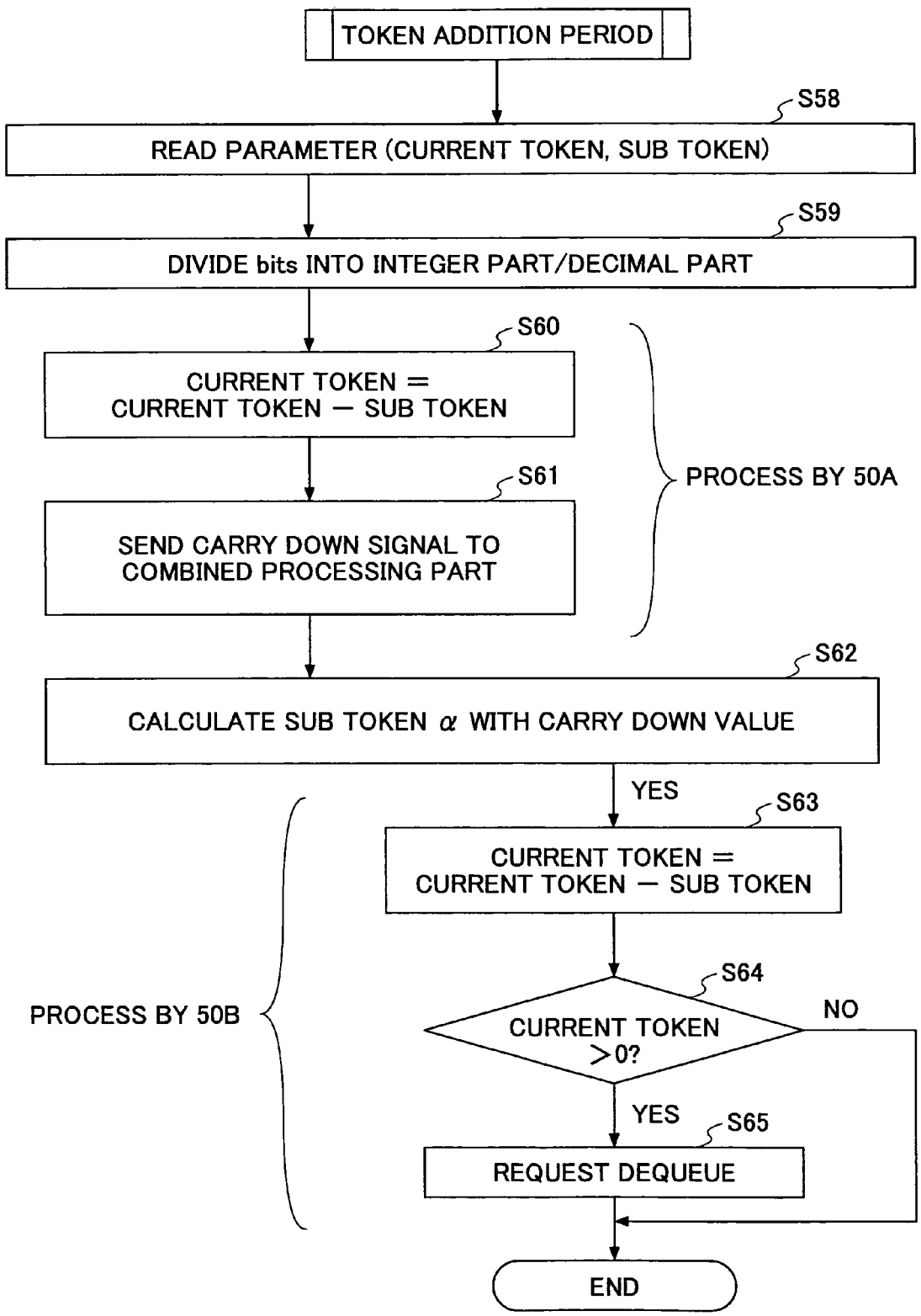
FIG. 23 is a flowchart showing a token subtraction operation according to another embodiment of the present invention.

FIG. 22 is a flowchart showing a dequeue operation according to another embodiment of the present invention. FIG. 23 is a flowchart showing a token subtraction operation according to an embodiment of the present invention. In this example, the number of bits 2X of the current token 51A is 32 bits (2X=16+16=32). The length of the dequeue packet is 14 bits. The 32 bits of the entire current token 51A includes an Sa integer part of 14 bits and an SB decimal part of 14 bits. The integer part Sa of the entire sub token 51B is 14 bits. The value of SB and Sa are set from the outside.

The settings for the shaper circuits 50A and 50B are performed separately. The lower bits for each of the parameters are set in the shaper circuit 50A. Therefore, the set value B1 of the shaper circuit 50A is 14 (B1=14), the set value B2 of the shaper circuit 50B is 0 (B2=0), the set value a1 of the shaper circuit 50A is 2 (a1=2), and the set value a2 of the shaper circuit 50B is 12 (a2=12). The set values of the shaper circuits 50A and 50B are added in the combined processing circuit 40. As a result, SX is 32 (SX=32), SB is 14 (SB=14), and Sa=14. In addition to setting the values of B1, B2, a1, and a2, the actual values of the thresholds 51b for the shaper circuits 30A and 30b are also set.

In Step S21 of FIG. 22, required parameters (current token, threshold) of the shaper circuits 50A and 50B are read in accordance with a dequeue instruction.

In Step S52, the bits of the current token in the shaper circuit 50A are divided into a decimal part B1 of 14 bits (B1=14) and an integer part A1 of 2 bits (A1=2) in a case where the number of bits X1 is 16 (X=16). The bits of the current token in the shaper circuit 50B are divided into a decimal part B2 of 0 bits (B2=0) and an integer part A2 of 16 bits (A2=16) in a case where the number of bits X2 is 16 (X=16).

In Step S53, the dequeue length addition part 52a of the shaper circuit 50A adds the length of the dequeue packet to the current token 51A.

In Step S54, the shaper circuit 50A sends a carry up (CU) bit of the dequeue length addition part 52a to the combined processing part 40.

In Step S55, the combined processing part 40 sends a length β (length added with the carry up Cu) to the shaper circuit 50B.

In Step S56, the dequeue length addition part 52a of the shaper circuit 50B adds the length of the dequeue packet to the current token 51a. Then, the threshold comparison part 52c compares the current token 51a with the threshold.

The shaper circuit 50A sends an "Equal_a" signal indicating (Equal_a=1) to the combined processing circuit 40 in a case where the current token 51a is equal to the threshold (current token 51a=threshold). The shaper circuit 50A sends an "Over_a" signal indicating (Over_a=1) to the combined processing circuit 40 in a case where the current token 51a is greater than the threshold (current token 51a>threshold). Likewise, the shaper circuit 50B sends an "Equal_b" signal indicating (Equal_b=1) to the combined processing circuit 40 in a case where the current token 51a is equal to the threshold (current token 51a=threshold). The shaper circuit 50B sends an "Over_b" signal indicating (Over_b=1) to the combined processing circuit 40 in a case where the current token 51a is greater than the threshold (current token 51a>threshold).

The combined processing circuit 40 uses a determination table shown in FIG. 24 and sends a Max signal indicating (Max=1) to the shaper circuits 30A and 30B when the current token is greater than the threshold.

In Step S57, the dequeue permission request is output from the dequeue permission determining part 32d only when the current token 51a is determined to be no greater than the threshold in Step S56.

In Step S58 of FIG. 23, required parameters (current token, sub token) of the shaper circuits 50A and 50B are read in the token subtraction period.

In Step S59, the bits of the current token in the shaper circuit 50A are divided into a decimal part B1 of 14 bits (B1=14) and an integer part A1 of 2 bits (A1=2) in a case where the number of bits X1 is 16 (X=16). The bit number of the sub token is also recognized since "a1" equals 2 bits (a1=2). The bits of the current token in the shaper circuit 50B are divided into a decimal part B2 of 0 bits (B2=0) and an integer part A2 of 16 bits (A2=16) in a case where the number of bits X2 is 16 (X=16). The bit number of the sub token is also recognized since "a2" equals 12 bits (a2=12).

In Step S60, the sub token subtraction part 52b of the shaper circuit 50A subtracts the sub token 51b from the current token 51a.

In Step S61, the shaper circuit 50A sends a carry down (CD) bit of the sub token subtraction part 52b obtained in Step S60 to the combined processing part 40.

In Step S62, the combined processing part 40 sends a sub token α (sub token 51c of the shaper circuit 50B added with the carry down CD) to the shaper circuit 50B.

In Step S63, the sub token subtraction part 52*b* of the shaper circuit 50B subtracts the sub token 51*c* from the current token 51*a*.

In Step S64, the dequeue permission determining part 52*d* of the shaper circuit 50B determines whether the current token is greater than 0.

In Step S65, a dequeue permission request is output from the dequeue permission determining part 52*d* in a case where the current token 51*a* is determined to be greater than 0.

Accordingly, the number of bits of the parameters in the shaper circuit of the third embodiment of the present invention can be doubled. Thus, the shaper circuit of this embodiment can be more satisfactorily used in accordance with the band and/or the precision requested for the transmission apparatus.

Further, the present invention is not limited to these embodiments, but variations and modifications may be made without departing from the scope of the present invention.

The present application is based on Japanese Priority Application No. 2006-080802 filed on Mar. 23, 2006, with the Japanese Patent Office, the entire contents of which are hereby incorporated by reference.

What is claimed is:

1. A shaper circuit for controlling input packets using a token bucket algorithm, the shaper circuit comprising:
    a parameter storage part to store a current token, an add token, and a max token therein;
    a dequeue subtraction part to subtract a packet length of a dequeue target from the current token stored in the parameter storage part and storing the current token in the parameter storage part;
    an add token addition part to add the add token stored in the parameter storage part to the current token stored in the parameter storage part at constant periodic intervals and to store the resulting current token in the parameter storage part;
    a max token comparison part to compare the result of the addition of the add token addition part with the max token stored in the parameter storage part and preventing the addition result from exceeding the max token; and
    a dequeue permission determining part to output a dequeue permission request when the result of the subtraction of the dequeue subtraction part is no less than 0 and when the result of the addition of the add token addition part is no less than 0;
    wherein number of bits are defined for each of the current token, the add token, and the max token by setting number of bits in a decimal part of the current token and setting number of bits in an integer part of the add token.

2. A shaper circuit combination, the shaper circuit combination comprising:
    a combination of first and second shaper circuits, each shaper circuit having substantially the same configuration as the shaper circuit as claimed in claim 1; and
    a combined processing part connected between the first and the second shaper circuits for expanding the number of bits of the current token, the add token, and the max token stored in the parameter storage part of the first and the second shaper circuits.

3. The shaper circuit combination as claimed in claim 2, wherein the combined processing part to receive a carry up signal from the add token addition part of the first shaper circuit, a carry down signal from the dequeue subtraction part of the first shaper circuit, and comparison results from each of the max token comparison parts of the first and the second shaper circuits,
    wherein the combined processing part includes
        a next length calculating part to add the carry down signal to the packet length of the dequeue target and to send the addition result to the dequeue subtraction part of the second shaper circuit, and
        a next add token calculating part to add the carry up signal to the add token in the parameter storage part of the second shaper circuit, to send the addition result to the add token addition part of the second shaper circuit, to generate a signal for setting the value of the current token equal to the value of the max token according to the comparison results of the max token comparison part of the first and the second shaper circuits, and to send the signal to the first and the second shaper circuits.

4. A shaper circuit for controlling input packets using a leaky bucket algorithm, the shaper circuit comprising:
    a parameter storage part to store a current token, a sub token, and a threshold therein;
    a dequeue length addition part to add a packet length of a dequeue target to the current token stored in the parameter storage part and storing the added current token in the parameter storage part;
    a sub token subtraction part to subtract the sub token stored in the parameter storage part from the current token stored in the parameter storage part at constant periodic intervals and storing the current token in the parameter storage part;
    a threshold comparison part to compare the result of the addition of the dequeue length addition part with the threshold stored in the parameter storage part and requesting dequeue permission when the addition result is no greater than the threshold; and
    a dequeue permission determining part to output a dequeue permission request when the result of the subtraction of the sub token subtraction part is greater than 0;
    wherein number of bits are defined for each of the current token, the sub token, and the threshold by setting number of bits in a decimal part of the current token and setting number of bits in an integer part of the sub token.

5. A shaper circuit combination, the shaper circuit combination comprising:
    a combination of first and second shaper circuits, each shaper circuit having substantially the same configuration as the shaper circuit as claimed in claim 4; and
    a combined processing part connected between the first and the second shaper circuits for expanding the number of bits of the current token, the sub token, and the threshold stored in the parameter storage part of the first and the second shaper circuits.

6. The shaper circuit combination as claimed in claim 5, wherein the combined processing part to receive a carry up signal from the dequeue length addition part of the first shaper circuit, a carry down signal from the sub token subtraction part of the first shaper circuit, and comparison results from each of the threshold comparison parts of the first and the second shaper circuits,
    wherein the combined processing part includes
        a next length calculating part to add the carry down signal to the packet length of the dequeue target and sending the addition result to the dequeue length addition part of the second shaper circuit, and
        a next add token calculating part to add the carry up signal to the sub token in the parameter storage part of the second shaper circuit, sending the addition result to the sub token subtraction part of the second shaper circuit, to generate a signal for requesting the dequeue permission according to the comparison results of the threshold comparison part of the first and the second shaper circuits, and to send the signal to the first and the second shaper circuits.

* * * * *

UNITED STATES PATENT AND TRADEMARK OFFICE
CERTIFICATE OF CORRECTION

PATENT NO. : 7,778,174 B2
APPLICATION NO. : 11/448923
DATED : August 17, 2010
INVENTOR(S) : Yoko Ohta et al.

It is certified that error appears in the above-identified patent and that said Letters Patent is hereby corrected as shown below:

In Section (73) Assignee: Fujtisu Limited should read --Fujitsu Limited--.

Signed and Sealed this
Fifth Day of July, 2011

David J. Kappos
*Director of the United States Patent and Trademark Office*